(12) United States Patent
Adams

(10) Patent No.: US 9,731,982 B2
(45) Date of Patent: Aug. 15, 2017

(54) SURFACE MODIFIED CERAMIC FILTER

(71) Applicant: UNIVERSITY OF KANSAS, Lawrence, KS (US)

(72) Inventor: Craig D. Adams, North Logan, UT (US)

(73) Assignee: UNIVERSITY OF KANSAS, Lawrence, KS (US)

(*) Notice: Subject to any disclaimer, the term of this patent is extended or adjusted under 35 U.S.C. 154(b) by 253 days.

(21) Appl. No.: 13/679,800

(22) Filed: Nov. 16, 2012

(65) Prior Publication Data

US 2013/0341281 A1 Dec. 26, 2013

Related U.S. Application Data

(60) Provisional application No. 61/561,137, filed on Nov. 17, 2011.

(51) Int. Cl.
C02F 1/28 (2006.01)
B01D 39/20 (2006.01)
C04B 41/85 (2006.01)
C04B 41/50 (2006.01)

(52) U.S. Cl.
CPC ........... C02F 1/288 (2013.01); B01D 39/20 (2013.01); B01D 39/2093 (2013.01); C04B 41/50 (2013.01); C04B 41/85 (2013.01); B01D 2239/0478 (2013.01); Y02W 10/37 (2015.05)

(58) Field of Classification Search
CPC ............. C02F 1/28; C02F 1/288; B01D 39/20

USPC ....... 210/791, 670, 502.1, 497.01, 660, 509; 427/244

See application file for complete search history.

(56) References Cited

U.S. PATENT DOCUMENTS

| | | | |
|---|---|---|---|
| 5,749,955 A | 5/1998 | Shaked et al. | |
| 7,947,619 B2 | 5/2011 | Harvey | |
| 2008/0053895 A1* | 3/2008 | Harvey | 210/510.1 |
| 2011/0139726 A1* | 6/2011 | Jin et al. | 210/748.08 |

OTHER PUBLICATIONS

Dutta et al., Adsorption of Arsenate and Arsenite on titanium dioxide suspensions, Jul. 2, 2004.*
Zhu et al., Quantum Chemical Study of Arsenic (III, V) Adsorption on Mn-Oxides: Implications for Arsenic (III) Oxidation, Jul. 6, 2009.*
Dzombak et al, Sorption of Cadmium on Hydrous Ferric Oxide at High Sorbate/Sorbent Ratios: Equilibrium, Kinetics, and Modeling, J Colloid and Interface Sci 112(2) 588-598 (1986).
Dixit et al., Comparison of Arsenic(V) and Arsenic(III) Sorption onto Iron Oxide Minerals: Implication for Arsenic Mobility, Environ Sci Technol 37 4182-4189 (2003).
Fahlin, Hydraulic Properties Investigation of the Potters for Peace Colloidal Silver Impregnated, Ceramic Filter, Technical Paper Univ of Colorado (Mar. 7, 2003).

(Continued)

Primary Examiner — Robert Clemente
Assistant Examiner — Akash Varma
(74) Attorney, Agent, or Firm — Stinson Leonard Street LLP

(57) ABSTRACT

A porous ceramic filter having one or more coatings of elemental or compounds of iron, manganese, aluminum, titanium, or mixtures thereof deposited on the surface of the pores.

24 Claims, 5 Drawing Sheets

(56) References Cited

OTHER PUBLICATIONS

Sherman et al., *Surface complexation of arsenic(V) to iron(III) (hydr)oxides: Structural mechanism from ab initio molecular geometries and EXAFS spectroscopy*, Geochimica et Cosmochimica Acta 67(22) 4223-4230 (2003).

Berg et al., *Arsenic Removal from Groundwater by Household Sand Filters: Comparative Field Study, Model Calculations, and Health Benefits*, Environ Sci Technol 40 5567-5573 (2006).

Ko et al., *Arsenic Removal by a Colloidal Iron Oxide Coated Sand*, J Environ Eng ASCE 891-898 (Sep. 2007).

Guan et al., *Removal of arsenic from water: Effect of calcium ions on As(III) removal in the KMnO4—Fe(II) process*, Water Research 43(20) 5119-5128 (2009).

Mitrakas et al., *Predicting Fe3+ dose for As(V) removal at pHs and temperatures commonly encountered in natural waters*, Chemical Engineering Journal 155(3) 716-721 (2009).

Nguyen et al., *Adsorption and removal of arsenic from water by iron ore mining waste*, Water Science and Technology 60(9) 2301-2308 (2009).

Nguyen et al., *Arsenic removal by iron oxide coated sponge: treatment and waste management*, Water Science and Technology 60(6) 1489-1495 (2009).

Zhu et al., *Quantum Chemical Study of Arsenic (III, IV) Adsorption on Mn-Oxides: Implications for Arsenic(III) Oxidation*, Environ Sci Technol 43 6655-6661 (2009).

Li et al., *Preparation of iron-oxide coated porous ceramics filter and adsorption and degradation on methylene blue*, Advanced Materials Research v97-101 1285-1289 (2010).

Mlilo et al., *Arsenic and Fluoride Removal Using Simple Materials*, Journal of Environmental Engineering 136(4) 391-398 (2010).

Roy et al., *Modeling Arsenite Adsorption on Rusting Metallic Iron*, Journal of Environmental Engineering 136(4) 405-411 (2010).

Hering et al., *Role of Coupled Redox Transformation in the Mobilization and Sequestration of Arsenic*, American Chemical Society, ACS Symposium Series, Chapter 21 (2011).

International Search Report and Written Opinion from corresponding PCT application PCT/US2012/065667 dated Jan. 18, 2013.

\* cited by examiner

SURFACE MODIFIED CERAMIC FILTER

CROSS-REFERENCE TO RELATED APPLICATIONS

This application is based on and claims priority to U.S. Provisional Application Ser. No. 61/561,137, filed on Nov. 17, 2011, which is incorporated herein by reference in its entirety.

STATEMENT REGARDING FEDERALLY SPONSORED RESEARCH OR DEVELOPMENT

This invention was made with government support under Department of Defense Grant No. FED00068157. The government has certain rights in the invention.

BACKGROUND OF THE INVENTION

1. Field of the Invention

The present invention relates to surface modified ceramic filters useful, for among other things, as water purification filters and water purification devices. Additionally, the present invention relates to a method of making the surface modified ceramic filters and a method for employing the same in water purification filters and water purification devices.

2. Description of Related Art

Due to worldwide growth in population and industrialization, along with natural disasters, world supplies of safe drinking water are dwindling. Key pollutants that pose a threat to humans via polluted water consumption are pathogens (bacteria and viruses) and chemical toxins including both inorganics (e.g., metals) and organics (e.g., pesticides). Conventional water filters are commonly used in American households to remove water impurities and provide cleaner, more aesthetically pleasing drinking water.

However, there are many disadvantages that make these filters complex, difficult to use, and difficult to maintain, especially in developing countries. Typically, such filters are expensive, bulky, difficult to install and replace, and cumbersome to use. Thus, there remains a need to provide new and improved filtering devices.

BRIEF SUMMARY OF THE INVENTION

The present invention is directed to monolithic porous filtration devices, their method of manufacturing, and their various uses for filtering contaminated liquids such as drinking water. The monolithic porous filtration devices of the present invention have a number of advantages, including being highly effective at simultaneous disinfection bacterial, protozoan and other pathogens, as well as inorganic chemical contaminants (such as arsenic, fluoride, cadmium, chromium, selenium, thallium, lead, and/or copper).

In an exemplary aspect, a monolithic porous filtration device for purifying water contaminated with one or more inorganic metals is provided. The device comprises a monolithic porous filter element comprised of a clay article having a plurality of pores; and a metal coating applied to the surface of the pores. In one aspect, the metal coating comprises (1) iron and at least one or more of manganese, aluminum, titanium, or combinations thereof; or (2) manganese, aluminum, titanium or combinations thereof. Exemplary coatings include those comprising a Mn coating, an Al coating, a $TiO_2$ coating, an iron/silver coating, an iron/aluminum coating, an iron/manganese coating, an iron/titanium coating, an Fe/Al/Mn coating, and an Mn/Al coating.

In one aspect, the monolithic porous filtration device is in the shape of a pot, cup, tube, cylinder, disk, box, or bucket. In another aspect, monolithic porous filtration device is prepared by forming a mixture of clay and a combustible material, and firing the mixture until the monolithic porous filter element is formed. The method also includes the step of annealing the coating to the monolithic porous filter element by heating.

In the present invention, the clay may be prepared with varied combustible materials (size, spherical versus fibrous, more uniform versus less uniform, etc) to create different pore structures to optimize the selectivity of the filters for specific molecules through size and diffusional mechanisms. Preparing clay with different sized combustible materials with smaller size enhances disinfection and larger sizes favor higher flowrates and effective chemical contaminant removal, and the ability to coat very thick coatings with mixtures and individual metals (e.g., thick Al or Al/Fe coating for F removal). Further, the filters may be coated with individual and mixtures of metals and metal oxides (including combinations of Fe, Al, Mn, Ti, and others) using different salts to create filters optimized and removing wide range and combinations of inorganic and organic contaminants. The coatings may be applied in homogeneous layer(s) of individual or mixed metal coatings coated typically in sequential coating steps. The coating methods may be enhanced by use of static and/or variable pressure and vacuum (including ultrasonics) during coating to effectively coat interior pore surface area of ceramic filter through discharging entrapped air and by other mechanism. Further, in another aspect, the filters may be pregassed prior to coating with alternative gases (e.g., helium) to facilitate effectively coating of interior surface area of ceramic filter through discharging entrapped air and by other mechanism. In addition, firing of clay ceramic at lower (e.g., 600° C.) and higher (e.g., 1150° C.) temperatures may be used to adjust and optimize ceramic adsorptive and other properties. Lastly, annealing (firing) metal surface coatings at lower (e.g., 400° C.) and higher (e.g., 900° C.) temperatures may be used to adjust and optimize ceramic adsorptive and other properties.

In an exemplary aspect, the monolithic porous filtration device is capable of removing both As(III) and As(V) from high concentrations (e.g., 250 µg/L) to much below the WHO guidelines (of 10 µg/L) for over two years at a rate of one pot per day. Moreover, the monolithic porous filtration device is highly effective for both As(III) and As(V) with no pretreatment required (e.g., oxidation or filtration). Separate steps are not needed to oxidize As(III) to As(V) prior to treatment, or to filter after treatment. In addition, the monolithic porous filtration device produces no sludge. The monolithic porous filtration device is readily able to be used as a point-of-use ("POU") water treatment in developing nations and developed nations. The monolithic porous filtration device is effective over a wide range of drinking water pH (e.g., about 5 to about 10, but usually about 6 to 9) and retains its effectiveness to remove inorganic contaminants to below relevant heath concentrations in waters with higher natural organic levels (i.e., high total organic carbon). Moreover, the monolithic porous filtration device is relatively inexpensive and can be manufactured in rural and isolated settings using local materials. For example, the monolithic porous filtration device can be produced easily by any local potter making clay pots. Lastly, disposal of the monolithic porous filtration device involves disposal a solid monolithic filter, which is very easy to handle, transport and store without metal leaching.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
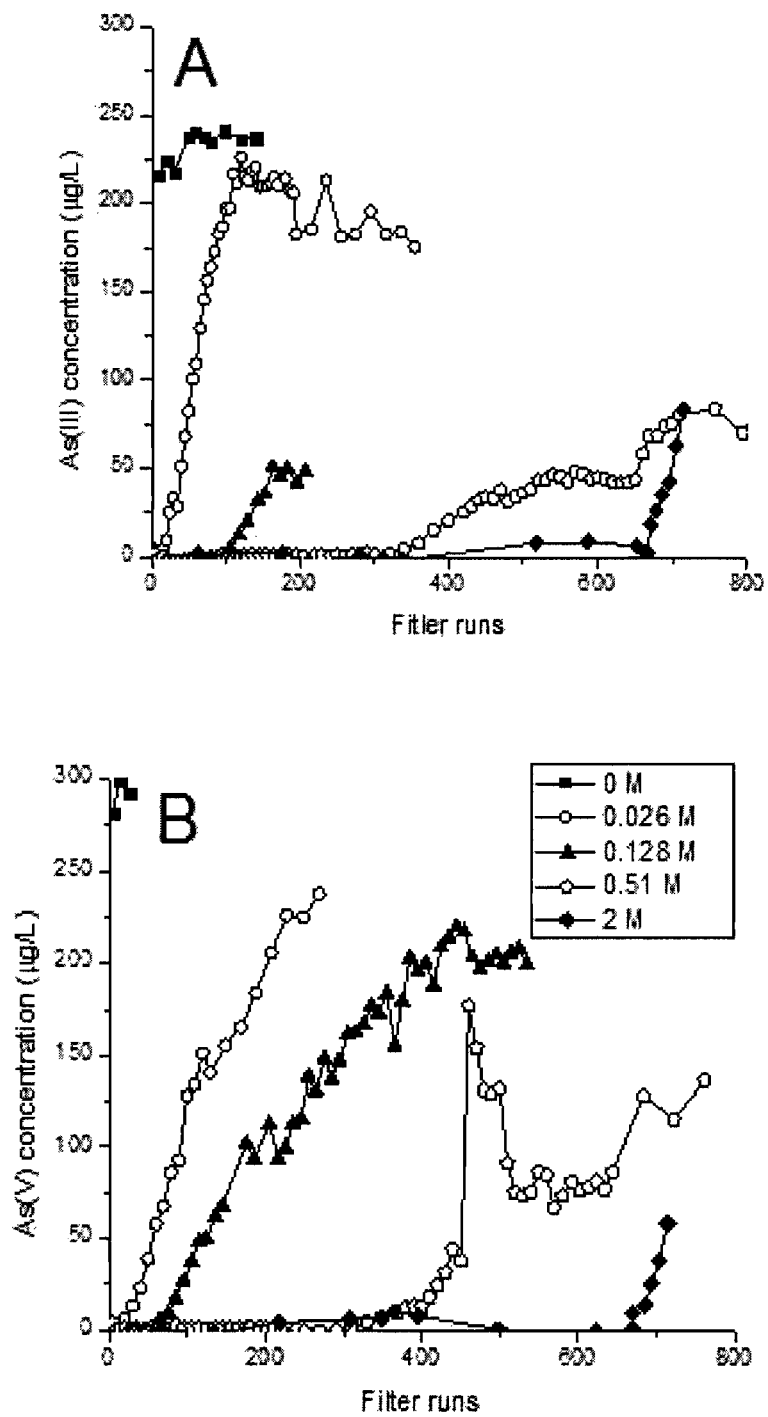
FIG. 1 illustrates the breakthrough curves for As(III) (FIG. 1A) and As(V) (FIG. 1B) in lab water at pH 7.5 with influent As concentrations of 250 µg/L on 0, 0.026, 0.128, 0.51, and 2 M iron coated filters (also coated with 200 mg/L colloidal silver).

The present invention is directed to a monolithic porous filtration device for purifying contaminated fluids, such as water. The device comprises a monolithic porous filter element comprised of a clay article having a plurality of pores. A metal coating is applied to the surface of the pores. The metal coating comprises compounds of or elemental iron, manganese, aluminum, or titanium, or mixtures thereof. The present invention is also directed to a method for purifying fluids, such as water, using the monolithic porous filtration device. Preferred metal coatings for removal of arsenate (As(V)) and arsenite (As(III)) in drinking water include Fe, Mn, Fe/Al, Fe/Mn, and Mn/Al. Preferred metal coatings for removal of cadmium (Cd) in drinking water include Fe, Al, Mn, Fe/Al, Fe/Mn, and Mn/Al. Preferred metal coatings for removal of copper (Cu) in drinking water include Fe, Al, Mn, Fe/Al, Fe/Mn, and Mn/Al. Preferred metal coatings for removal of fluoride (F) in drinking water include Al, Mn, Fe/Al, Fe/Mn, and Mn/Al. Preferred metal coatings for removal of oxyanions of chromium (Cr) in drinking water include Fe, Mn, Fe/Al, Fe/Mn, and Mn/Al. Preferred metal coatings for removal of lead (Pb) in drinking water include Fe, Al, Mn, Fe/Al, Fe/Mn, and Mn/Al. Preferred metal coatings for removal of nickel (Ni) in drinking water include Fe, Al, Mn, Fe/Al, Fe/Mn, Mn/Al. Preferred metal coatings for removal thallium (Tl) in drinking water include Fe, Al, Mn, Fe/Al, Fe/Mn, and Mn/Al. Preferred metal coatings for removal of oxyanions of selenium (Se) in drinking water include Al, Mn, Fe/Al, Fe/Mn, and Mn/Al.

To produce the monolithic water purification filter, a mixture of clay and solid organic combustible material is formed. This mixture is pressed in a set of dies in the desired shape of the monolithic porous filter element (e.g., a pot or bucket), removed, and fired to create the monolithic porous filter element. The monolithic porous filter element is then coated with a metal coating comprised of iron, manganese, aluminum, or titanium, or mixtures thereof.

As used herein, the term "monolithic" refers to a porous filter element or device that is essentially solid, one-piece, continuous in nature, and not broken (although it is porous in nature). That is, the filter element is not comprised of particulate material that has been fused together in some manner.

Clay, as used in this invention, encompasses any fine-grained, firm earth material that is plastic when wet and hardens when heated. Clays useful for the present invention include, for example without limitation, kaolinites, montinorillonite/smectites, illites, chlorites, red clay, and molar clay. Kaolinites include, for example, kaolinite, dickite, and nacrite. Montmorillonite/smectites include, for example, pyrophyllite, talc, vermiculite, sauconite, saponite, nontronite, and montmorillonite. Clays are typically mixtures of these one or more of these different types, along with other weathered minerals. The clay utilized by the present invention is plastic and moldable when mixed with water, retains its shape on drying, and becomes permanently hard on heating or firing, and/or cannot be broken down by water after firing. Non-limiting examples include white, red, gold, gray and other colored clays comprised of mixtures in varied mineralogical ratios of illite, montmorillonite, kaolinite, hematite, quartz, and K-feldspar. Clays that fire reddish (such as redart clay) can be found almost anywhere in the world, thus making them a convenient and practical source of clay. Therefore, in one exemplary aspect of the present invention, clays that fire reddish are utilized as the clay in the filter element with an illite-based mineralogy. In another aspect, the clay may be a natural gray clay with a kaolinite-based mineralogy.

In one aspect, the clay has a mesh size (i.e., relating to the number of holes per linear inch of a sieve screen) of about 30 mesh (about 595 µm). In another aspect, the clay has a mesh size of 10, 20, 40, 50, or up to about 100 mesh or some range therebetween (about 2000, 841, 400, 297 or down to about 149 µm). In alternate embodiments, the mesh size is about 20 mesh (about 840 µm).

The combustible material may be any material which burns off during firing to create voids/pores in the clay to make it porous. Organic materials of plant or animal origin have been found to have properties which provide suitable burn off during firing. Examples of combustible material include, but are not limited to, grain flour, sawdust of hard and soft woods, sorghum, rice flour, rice husk, millet husk, milled corn cobs, or a combination thereof. In particular, grain flour is a exemplary combustible material. Wheat flour is widely prevalent as an inexpensive resource. Thus, in an exemplary embodiment of the present invention, wheat flour is used as the combustible material. In another exemplary embodiment, sawdust is used as the combustible material.

In one aspect, the combustible material has a mesh size from about 10 mesh (about 2000 μm) to about 400 mesh (about 37 pin). For example, the combustible material may be such that it sieved though a single have a mesh having a size of about 10, 20, 30, 40, 50, 60, 70, 80, 100, 200, or 400 mesh or some range therebetween (about 2000, 840, 595, 400, 297, 250, 177, 149, 74, or 37 μm or some range therebetween). Sieving through a single mesh size retains all materials with sizes smaller than that mesh size, creating a wider range of combustible materials (lower uniformity in size) and resulting pores. A mixture or range of pore diameters can provide improved adsorption properties by adsorbing both small and larger molecules, and/or by excluding larger material (e.g., natural organic material) from entering a smaller pore and tying up the surface coating area and adsorption sites. Combustible material may instead be a size fraction between two mesh sizes to create a more homogeneous-sized pore structure. The combustible material may be of different shapes (e.g., spherical vs. fibrous) to created channels of uniform of a specific diameter (e.g., 74 μm).

The amount of clay and combustible material utilized in the mixture will vary depending upon the desired porosity and properties of the filter. In some embodiments, the clay comprises about 10, 15, 20, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % (or some range therebetween) of the mixture. In some embodiments, the clay comprises about 67% of the total mixture. The combustible material comprises about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 80, 85, or 90 wt % (or some range therebetween) of the mixture. Generally, in a preferred embodiment, the amount of clay utilized is about 40% to about 80% by weight and the amount of combustible material utilized is about 20% to about 60% by weight. In a more preferred embodiment, the amount of clay utilized is about 70% to about 80% by weight and the amount of combustible material utilized is about 20% to about 30% by weight.

The mixture of the clay and combustible material may optionally include one or more porosity control chemicals. Porosity control chemicals useful for the present invention include, for example without limitation, liquid wax, beeswax, animal fats, oils such as corn oil, olive oil, and other vegetable and plant oils, and paraffin. In some embodiments, to prepare the porous pottery granules, the porosity control chemical is mixed with water and then sprayed into the dry mix of clay and carbon source with constant agitation. In some embodiments, about four liters of porosity control chemical is used for every 15 kg of dry mix. The amount of porosity control chemical used may be, for example, about 1 to 6 liters for every 15 kg of dry mix. In some embodiments, the amount of porosity control chemical is about 1.0, 1.5, 2.0, 2.5, 3.0, 3.5, 4.0, 5.0, 5.5, or 6.0 liters for every 15 kg of dry mix. In some embodiments, the porosity control chemical is mixed with an equal volume of water prior to being added to the dry mix. The porosity control chemical may be mixed with, for example, from about 0 to 2 volume(s) of water prior to addition to the dry mix. In some embodiments, the amount of water added to the porosity control chemical is about 0, 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.6, 1.7, 1.8, 1.9, or 2.0 volume(s).

The amount of water utilized is at least the amount necessary to sufficiently allow a uniform mixing of the clay and combustible material (and optional porosity control chemicals). In one embodiment, water is first mixed with the clay and then the combustible material is added. In another embodiment, the combustible material and clay are first mixed together and then the water is added. Preferably, the percentage by weight of water added is not so excessive as to inhibit good flow. Typically, about 10 to 50 percent by weight (e.g., about 10, 15, 20, 25, 30, 35, 40, 45, or 50 wt %) of water to the dry mix is used. In either case, the mixture may be mixed at the correct percentage water, without the need for further drying.

Thus, in an exemplary embodiment of the present invention, the clay and water combination is allowed to stand for about zero to about 44 hours (e.g., about 0, 1, 2, 3, 4, 8, 12, 18, 24, 30, 36, 40, or 44 hours) to permit the combination to become sufficiently plastic. When the clay and water combination is considered to be sufficiently plastic, the combustible material is mixed into the clay and water combination.

In another embodiment, the clay and combustible material are mixed together, along with the water. Following mixing, the mixture may be allowed to dry to a suitable water content before the mixture is pressed or molded into the desired form or shape. For example, in another aspect, the mixture, following mixing, may be allowed to dry to a water content of about 8 to 15% by weight before the mixture is pressed into the desired form or shape. Or, the mixture of clay, combustible material, and water may be mixed at the correct percentage water, without the need for further drying.

In the present invention, the mixture of clay, combustible material, and water is pressed or molded into a monolithic form conducive to efficient firing. These forms may take the form of pot, cup, tube, cylinder, disk, box, candle, bucket, in-line filter, or any other suitable form. One exemplary monolithic form is a bucket or pot which can be adapted for water filtration as promoted by Potters for Peace. The bucket or pot may be shaped to hold standard sized amounts of fluid, for example 1 liter, 4 liters, 10 liters, etc. One exemplary bucket, pot or pitcher is about 28 cm wide by 25 cm deep with a wall thickness of about 0.5 to 3 cm. Another exemplary bucket, pot, or pitcher is about 40 cm wide by 30 cm deep with a wall thickness of about 0.5 to 3 cm. Another exemplary bucket, pot or pitcher is about 100 cm wide by 100 cm deep with a wall thickness of about 1.5 to 4 cm. Another exemplary bucket, pot, or pitcher is about 10 cm wide by 12 cm deep with a wall thickness of about 0.5 to 3 cm. Another exemplary monolithic form is a disc (about 0.5 to 20 cm thick and about 0.5 to 20 cm in diameter) which may be adapted to fit on the end of a water hose, spigot, water line, or faucet. In another aspect, the monolithic form may be adapted to extend along a water line (e.g., refrigeration line), and may be, for example about 0.5 to 50 cm thick (e.g., about 0.5, 1, 2, 3, 4, 5, 10, 15, 20, 25, 30, 35, 40, 45, or 50 cm thick). Thicker devices can have larger pores because of pressure drop considerations as the fluid traverses the monolithic porous filter device, but the devices still achieve adequate removal of the toxins, or chemicals of interest from the fluid (e.g., water) and with increased contaminant capacities.

After pressing or molding, the monolithic form may undergo additional air drying (typically 0, 3, 6, 12, 15, 18, or 24 hours). After drying, the monolithic form is fired to create a monolithic porous filter element. Firing is a technique and procedure well known to those skilled in the art.

For example, the monolithic form may be fired in a kiln or other similar pottery oven. Kilns and firing technology are well known to those of skill in the art and are well described in literature such as The Kiln Book, Materials, Specifications and Construction, by Frederick Olsen (Chilton Book Co., second edition, 1983), which is incorporated by reference.

Generally speaking, firing begins slowly at a preliminary firing temperature, especially through the ignition point, typically between about 500 to 600° C. After the combustible material has burned off, the firing may be allowed to proceed at a rapid pace to a temperature higher than the preliminary firing temperature, up to 800° C. or greater, to the maturation temperature of earthenware, about 1000 to 1050° C. Lower or higher maximum temperatures (e.g., about 600, 700, 800, 900, 950, 1100, or 1150° C.) during firing are possible depending on the specific clay used and water content of the mixture being fired (e.g., clay mixtures with higher moisture or less coarse clay will use a slower temperature ramp). These values are easily determinable by those skilled in the art.

Firing continues until the monolithic porous filter element matures into earthenware and/or until the monolithic porous filter element can no longer be broken down by water. Maturing temperatures and times typically depend upon the properties of the specific kiln, pottery oven, or firing device used. However, such properties are usually easily ascertainable by a user and determining the maturing temperature and time particular to a specific firing device does not require undue experimentation by one skilled in the art. Generally, a sufficient temperature not to be broken down by water is at least about 500° C., the porous filter element will be fired for at least about three hours. More preferably, the firing is at a temperature of about 600° C. Even more preferably, the firing is at a temperature of about 700° C. Most preferably, the firing is at a temperature of about 900° C. to about 1100° C., depending on the clay properties and moisture content. Generally, in a preferred embodiment, the firing will last for at least about three hours to about 24 hours, depending in large part on the size of the kiln.

After firing is completed, an uncoated monolithic porous filter element is formed. The uncoated monolithic porous filter element contains a plurality of pores, the pore size being about 10 nm to about 2000 μm. In some embodiments, the pore size can be 0.01, 0.02, 0.05, 0.1, 0.2, 0.5, 1, 10, 50, 100, 200, 300, 400, 500, 600, 700, 800, 900, 1000, 1500 or 2000 μm. Small pore sizes results from fines (smaller particles) not removed in a dual sieve process, due to smaller pores connecting larger pores (especially in filters created with lower combustible material to clay ratios (e.g., about 10 to 30%) versus greater ratios (e.g., greater than about 50% to 70%)). Filters that mechanically separate bacteria and other microbes typically have a pore size in a network of pores in a ceramic filter of less than about 600 microns, which is believed to be an effective size for preventing bacteria, (e.g., *E. coli*, and fecal coliform) from passing through a filter element. The filtration mechanism may include smaller connecting channels between larger pores, and smaller effective pores being created by the initial filtration of solid material by the filter creating smaller effective pores. With larger pore sizes (e.g., about 10 to 40 mesh, or about 400 to 2000 μm), the uncoated monolithic porous filter element may be subsequently coated with thicker metal coatings as discussed more fully below. In a preferred embodiment, average pore sizes for the uncoated monolithic porous filter element created with a sawdust mixture sieved through a single 60 mesh (about 250 μm) sieve are about 10 to 100 nm (e.g., about 10, 20, 30, 40, 50, 60, 70, 80, 90, or 100 nm). In yet other embodiments, a pore size of up to about 1000 μm may be created by using 10 to 40 mesh (2000-400 μm) combustible material at higher clay to combustible material ratios (e.g., greater than 50%) and used in longer filters (e.g., in-line filters in a tube, pipe, or hose) with thick coatings to provide very thick adsorptive layers (up to about 400 μm). Pore size may be determined using the BJH (Barrett, Joyner, and Halenda) method and other methods.

The specific surface area of the uncoated monolithic porous filter element is typically about 0.2 m²/g to 2000 m²/g depending or desired properties and performance. In some embodiments, the specific surface area of the uncoated porous filter element can be about 0.2, 0.5, 1, 2, 3, 4, 5, 6, 7, 8, 9, 10, 15, 20, 25, 30, 35, 40, 45, 50, 55, 60, 65, 70, 75, 80, 85, 90, 100, 120, 140, 160, 180, 200, 220, 240, 260, 280, 300, 400, 500, 1000, 1500, or 2000 m²/g (or some range therebetween). The specific surface area may be determined using the BET (Brunauer, Emmet, and Teller) method as an exemplary method.

The porosity of the uncoated monolithic porous filter element is typically about 10 to 85% as determined by water uptake as an exemplary method. In some embodiments, the porosity of the uncoated porous filter element is about 10, 15, 20, 25, 30, 35, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% (or some range therebetween).

The total pore volume of the uncoated monolithic porous filter element is typically about 0.10 mL/g to 1.0 mL/g. In some embodiments, the total pore volume is about 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or 1.0 mL/g (or some range therebetween).

In the present invention, the monolithic porous filter element is coated with a metal coating, preferably a coating containing iron, manganese, aluminum, or titanium, either singly or in combination. The metals may be in either elemental or compound form. The metal coating is applied subsequent to the firing of the mixture comprising the water, clay, and combustible organic material. As discussed more fully below, the metal coating provides the ceramic filter with sorptive and reactive (e.g., oxidative, reductive, and/or hydrolytic) properties to simultaneously remove chemical and biological contaminants.

The metal coating may be applied using any suitable coating technique, for example, by brushing, spraying, soaking, dipping, painting, wiping, immersing a coating solution or dispersion containing the metal to the porous filter element with or without the use of pressure or vacuum assistance. Preferred techniques involve use of pressure and vacuum (especially static or varied pressure at about 1 to 5 atm), to drive the coating solution deeply into pores with initial or concurrent discharging of trapped gas. In one aspect, a solution containing the metal coating is forced through the pores of the porous filter element under constant or varied positive (or negative) pressure using a pump (e.g., piston, positive displacement, syringe, or other type), to force the solution more rapidly and deeply into the filter and to dislodge entrapped air, thereby more completely and uniformly coating the surfaces of the pores. The vacuum pressure is typically about 0.2 to 1 atm gage. The variation frequency in pressure may be on the order from ultrasonic frequencies to less than one cycle per hour. In another aspect, the porous filter element is dipped into a solution containing the metal for about 10 seconds to 48 hours (e.g., 10, 30, 45 seconds, or 1, 2, 3, 4, 5, 10, 15, 20, 30, 45, 60 minutes, or 2, 3, 4, 5, 6, 7, 8, 9, 10, 11, 12, 13, 14, 15, 16, 17, 18, 20, 22, 24, 36, or 48 hours) with or without the use of ultrasonics. In addition, the monolithic porous filter element may be agitated during the coating process in order to help ensure complete saturation of the pores. In another aspect, a solution containing the metal is allowed to flow through the pores of the porous filter element by gravity, thereby coating the surfaces of the pores.

The coating process may utilize one or more wetting agents to assist in penetration of pores and maximizing internal surface area coverage of coatings within ceramic filter. Exemplary wetting agents include organic surfactants, EDTA, NTA, etc. The coating process may also involved pre-gassing the porous filter element prior to coating with alternative gases (e.g., helium) to facilitate most effectively coat interior surface area of ceramic filter through discharging entrapped air and by other mechanism.

The solution or dispersion of the metal coating preferably comprises a one or more metal salts or complexes. Salts and complexes of iron, manganese, aluminum, or titanium singly or in mixtures are most preferred.

Although a metal coating which completely covers the surface area of the pores of the monolithic porous filter element is desirable, it will be appreciated that the filtration device may still be operable if there is only partial coverage. Thus, in one aspect, the metal coating may be applied such that the coating covers about 100, 90, 80, 70, 60, 50, 40, 30, 20, 10, 5, or 2% of the surface area of the pores of the monolithic porous filter element. However, higher coverage is usually desired to provide more absorptive coating per filter volume.

The concentration of the metal salt or complex in the coating solution or dispersion will depend on the pore size, metal, and desired coating thickness. In one aspect, the concentration of the metal salt in the coating solution or dispersion is about 0.01 M to 10 M. Thus, for example, the concentration of the metal salt in the coating solution or dispersion maybe about 0.01, 0.1, 0.25, 0.5, 0.75, 1.0, 1.25, 1.5, 1.75, 2, 2.25, 2.5, 2.75, 3.0, 3.25, 3.5 3.75, 4, 4.25, 4.5, 4.75, 5.0, 7.5, or 10 M.

The metal salt or complex in the solution or dispersion is preferably selected from the group consisting of iron, manganese, aluminum, or titanium salts or complexes. In one aspect, metal salt is either a ferric and/or ferrous compound. For example, the iron salt may be selected from the group consisting of ferric hypophosphite, ferric albuminate, ferric chloride, ferric citrate, ferric oxide saccharated, ferric ammonium citrate, ferrous chloride, ferrous gluconate, ferrous iodide, ferrous sulfate, ferrous lactate, ferrous fumarate, heme, ferric trisglycinate, ferrous bisglycinate, ferric nitrate, ferrous hydroxide saccharate, ferric sulfate, ferric gluconate, ferric aspartate, ferrous sulfate heptahydrate, ferrous phosphate, ferric ascorbate, ferrous formate, ferrous acetate, ferrous malate, ferrous glutamate, ferrous cholinisocitrate, ferroglycine sulfate, ferric oxide hydrate, ferric pyrophosphate soluble, ferric hydroxide saccharate, ferric manganese saccharate, ferric subsulfate, ferric ammonium sulfate, ferrous ammonium sulfate, ferric sesquichloride, ferric choline citrate, ferric manganese citrate, ferric quinine citrate, ferric sodium citrate, ferric sodium edetate, ferric formate, ferric ammonium oxalate, ferric potassium oxalate, ferric sodium oxalate, ferric peptonate, ferric manganese peptonate, and combinations thereof.

In another aspect, the iron salt is selected from the group consisting of ferric acetate, ferric fluoride, ferric phosphate, ferric pyrophosphate, ferrous pyrophosphate, ferrous carbonate saccharated, ferrous carbonate mass, ferrous succinate, ferrous citrate, ferrous tartrate, ferric fumarate, ferric succinate, ferrous hydroxide, ferrous nitrite, ferrous nitrate, ferrous carbonate, ferric sodium pyrophosphate, ferric tartrate, ferric potassium tartrate, ferric subcarbonate, ferric glycerophosphate, ferric saccharate, ferric hydroxide saccharate, ferric manganese saccharate, ferrous ammonium sulfate, and combinations thereof.

In another aspect, then iron salt selected from the group consisting of ferric sodium pyrophosphate, ferrous carbonate, ferric hydroxide, ferrous oxide, ferric oxyhydroxide, ferrous oxalate, and combinations thereof.

In still another aspect, the iron complex is selected from the group consisting of polysaccharide-iron complex, methylidine-iron complex, EDTA-iron complex, phenanthrolene iron complex, p-toluidine iron complex, ferrous saccharate complex, ferrlecit, ferrous gluconate complex, ferrum vitis, ferrous hydroxide saccharate complex, iron-arene sandwich complexes, acetylacetone iron complex salt, iron-dextran complex, iron-dextrin complex, iron-sorbitol-citric acid complex, saccharated iron oxide, ferrous fumarate complex, iron porphyrin complex, iron phtalocyamine complex, iron cyclam complex, dithiocarboxy-iron complex, desferrioxamine-iron complex, bleomycin-iron complex, ferrozine-iron complex, iron perhaloporphyrin complex, alkylenediamine-N,N'-disuccinic acid iron(III) complex, hydroxypyridone-iron(III) complex, aminoglycoside-iron complex, transferrin-iron complex, iron thiocyanate complex, iron complex cyanides, porphyrinato iron(III) complex, polyaminopolycarbonate iron complexes, dithiocarbamate iron complex, adriamycin iron complex, anthracycline-iron complex, MGD-iron complex, ferrioxamine B, ferrous citrate complex, ferrous sulfate complex, ferric gluconate complex, ferrous succinate complex, polyglucopyranosyl iron complex, polyaminodisuccinic acid iron complex, biliverdin-iron complex, deferiprone iron complex, ferric oxyhydride-dextran complex, dinitrosyl dithiolato iron complex, iron lactoferrin complexes, 1,3-PDTA ferric complex salts, diethylenetriaminepentaacetic acid iron complex salts, cyclohexanediaminetetraacetic acid iron complex salts, methyliminodiacetic acid iron complex salts, glycol ether diaminetetraacetic acid iron complex salts, ferric hydroxypyrone complexes, ferric succinate complex, ferric chloride complex, ferric glycine sulfate complex, ferric aspartate complex, sodium ferrous gluconate complex, ferrous hydroxide polymaltose complex, and combinations thereof.

In still another aspect, the aluminum salt or complex has an anion or ligand such as any of those listed above for iron. For example, the aluminum salt may be selected from the group consisting of aluminum hydroxide, aluminum nitrate and aluminum sulfate and combinations thereof.

In still another aspect, the manganese salt or complex has an anion or ligand such as any of those listed above for iron. For example, the manganese compound, salt, or complex may be selected from the group consisting of manganese dioxide, manganese chloride, manganese borate, manganese nitrate, manganese phosphate, manganese sulfate, and combinations thereof.

In still another aspect, the titanium compound, salt, or complex has an anion or ligand such as any of those listed above for iron. In a preferred aspect, coating is comprised of titanium dioxide. $TiO_2$ when exposed to visible and/or UV light generates highly reactive radical species (e.g., hydroxyl radical) that is a strong, non-selective oxidant capable of oxidizing a wide range of organic compounds, inorganic compounds, and microorganisms. $TiO_2$ would preferably be applied only to the exterior surfaces of the monolithic porous filter element due to the necessity of expose the $TiO_2$ to visible and/or UV light to become active. The $TiO_2$ can be painted on, dipped, sprayed, or otherwise applied. Annealing or fusing of the $TiO_2$ can be by a variety of means to the ceramic.

After applying the coating solution or dispersion to the porous filter element, the coating is then fixed or annealed to the pore surface by heating the coated porous filter element for a period of time. In one exemplary aspect, the coated porous filter element is heated to about 80 to 200° C. (with temperatures of 100 to 120° C. being most preferred) over period of 2 to 10 hours (with times of 3 to 5 hours being most preferred). Other heating cycles may be applied to further drive off the carrier solution or burn off the organic portion of the coating solution. For example, the coated porous filter element maybe heated at about 400 to 900° C. (with temperatures of about 500 to 600° C. being most preferred) for about 1 to 7 hours (with times of about 2 to 4 hours being most preferred).

It will be appreciated that the monolithic porous filter element may be subjected to single or multiple coating steps—with each step having the same or different metal(s) containing compound, the same or different metal(s) concentration, the same or different coating time, the same or different fixing/annealing step. The metal coating may be applied in a single or multiple step process. For example, in one aspect, a single homogeneous layer of single metal or mixed metal coatings may be applied to porous filter element. The coating could also be applied in sequential coating steps. For example, in one embodiment, multiple coatings—each comprised of different metal(s)—are applied in layers through sequential coatings to create multilayer coatings optimized based on diffusivities and selectivity for specific contaminant removal and to provide optimal adhesion in some cases. The concentration of the metal(s) in each coating step may be the same or different. Likewise, the method used to add a metal layer may be the same or different. As an example, the monolithic porous filter element could be coated with a 0.1 M iron and 0.1 M aluminum solution using a dipping method and then annealed. As another example, the monolithic porous filter element could be first coated using first solution (e.g., 0.1 M iron) using a dipping method and then annealed, and then the filter element could be coated with a second solution (e.g., 0.1 Al) using a vacuum suction method.

The present invention is thus well suited to provide layers of coated metals (which may be the same or different), thereby modifying the coating to have a thickness and composition as desired. Exemplary thicknesses of the coating are about 0.0001 to 100 μm, for example about 0.0001, 0.0002, 0.0005, 0.001, 0.002, 0.005, 0.01, 0.02, 0.05, 0.1, 0.2, 0.5, 1, 2, 5, 10, 20, 50, or 100 μm (or some range therebetween). This range includes monolayers to thick coatings in larger-pored (e.g., about 2000 μm) long monolithic porous filter elements for ultra-high capacity filters. For example, in one embodiment, a thick coating is applied to an in-line monolithic porous filter element of about 20 cm in length used in-line at relatively high flow rates such that greater hydraulic conductivity and greater pore size is desired.

Also, it will be appreciated that the coating(s) of iron, manganese, aluminum, or titanium may be combined with other antimicrobial or metal coatings, such as those containing silver. These additives (as well as the primary coating) can provide catalytic activity (e.g., to convert a reduced to oxidized species) as well as direct adsorptive capacity. Thicker coatings may be applied to larger pores, and are for example, ideal for aluminum-based coatings that may be implemented for removal of fluoride or copper from the fluid (water).

In one embodiment, $TiO_2$ is coated on the exterior surfaces of the filter to allow oxidation of contaminants in the fluid (water) when the $TiO_2$ is subjected to visible and/or UV light. In one embodiment of the $TiO_2$ coated filter, organic chemicals (such as pesticides, pharmaceuticals, or algal toxins), inorganic chemicals (such as reduced inorganics) or microorganisms can be removed or oxidized by filtering water with the filter concurrently exposed to sunlight and/or artificial light. The $TiO_2$ coating may be used independently on the filter without Fe, Mn, or Al coating. Alternatively, the $TiO_2$ coating maybe used simultaneously with Fe-, Mn-, or Al-based coatings to achieve multiple objectives (e.g., oxidative removal of organics, and sorption of As (along with disinfection)). For example, $TiO_2$ may be applied to only the outside surfaces of the filter in a dip method with the primary coating (e.g., Fe, Mn, and/or Al individually or in mixtures) applied throughout the filter.

After coating, the coated monolithic porous filter element contains a plurality of pores, the pore size being about 5 nm to 2000 μm. In some embodiments, the pore size can be about 0.01, 0.02, 0.05, 0.1, 0.2, 0.5, 1, 10, 50, 100, 200, 300, 400, 500, 600, 700, 800, 900, 1000, 1500, or 2000 microns (or some range therebetween). In most embodiments, midsize pore sizes are typical. The much smaller pore size is for filters designed to operate at higher pressure (e.g., up to about 5 atm) and/or lower flow rates (e.g., 0.1 L/min/m$^2$), can provide enhanced disinfection, and may have greater specific surface areas for rapid adsorption and contaminant removal. Larger pored filters provide lower pressure drop and higher flow rates, and the ability to have much thicker surface coating (e.g., up to about 500 μm of Al, Fe, Mn, Al/Fe, Mn/Fe, Al/Mn, Al/Fe/Mn) for greatly enhanced contaminant adsorption capacities (albeit with diminished filtrative disinfection capacities in some cases). Preferred pore sizes for the coated monolithic porous filter element are about 5 to 100 nm (e.g., about 5, 10, 20, 30, 40, 50, 60, 70, 80, 90, or 100 nm), although pore sizes of about 200, 300, 400, 500, 600, 700, 800, 900, 1000, or even 2000 nm or more may be used. Pore size may be determined using the BJH (Barrett, Joyner, and Halenda) method as an exemplary method.

The specific surface area of the coated monolithic porous filter element is typically between about 0.2 m$^2$/g and 2000 m$^2$/g. In some embodiments, the specific surface area of the uncoated porous filter element can be about 0.2, 0.5, 1, 2, 3, 4, 5, 6, 7, 8, 9, 10, 15, 20, 25, 30, 35, 40, 45, 50, 55, 60, 65, 70, 75, 80, 85, 90, 100, 120, 140, 160, 180, 200, 220, 240, 260, 280, 300, 400, 500, 1000, 1500, or 2000 m$^2$/g (or some range therebetween). In exemplary embodiments, the surface area is about 1 to 10 m$^2$/g. Surface area is determined using the BET (Brunauer, Emmet, and Teller) method as an exemplary method.

The porosity of the coated monolithic porous filter element may be, for example, between about 10 and 85%. In some embodiments, the porosity of the uncoated porous filter element is about 10, 15, 20, 25, 30, 35, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% (or some range therebetween).

The total pore volume of the coated monolithic porous filter element can be about 0.10 mL/g to 1.0 mL/g. In some embodiments, the total pore volume is about 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or 1.0 mL/g (or some range therebetween).

In one aspect, the pore size (e.g., less than about 60 μm) and porosity (e.g., less than about 35%) of the coated monolithic porous filter element is such that the liquid to be purified (e.g., water) flows through the pot-shaped filtration device under gravity-driven flow at a rate of about 0.5 to 10 L/hr (e.g., about 0.5, 1, 2, 3, 4, 5, 6, 7, 8, 9, or 10 L/hr), with rates of about 1 to 3 L/hr being most preferred. In another aspect, the pore size (e.g., greater than about 500 μm) and pore porosity (e.g., greater than about 40%) of the coated monolithic porous filter element is such that the liquid to be purified (e.g., water) flows through the in-line filtration device under pressure-driven flow at a rate of about 5 to 100 L/hr (e.g., about 5, 10, 20, 30, 40, 50, or 100 L/hr (or some range therebetween).

The filtration devices of the present invention are well-suited for the removal of inorganic chemicals (e.g., As, F, Cu, Cd, Pb, Ni, Zn, Mn, and/or Cr, etc), organic chemicals and pathogens from water or other fluids. The filtration device also provides for oxidation and reduction reactions on the filter. For both inorganics and organics, redox reactions can enhance significantly the adsorption capacity of the filter by converting the contaminant to a form more easily adsorbed.

The filtration devices of the present invention can have an adsorption capacity for As(III) of, for example, about 10 μg/g filter to 2000 μg/g filter. In some embodiments, the filtration devices of the present invention have an adsorption capacity for As(III) of about 10, 20, 30, 40, 50, 60, 70, 80, 90, 100, 150, 200, 250, 500, 750, 1000, 1250, 1500, 2000 μg/g filter (or some range therebetween).

The filtration devices of the present invention can have an adsorption capacity for As(V) of, for example, of about 10 μg/g filter to 2000 μg/g filter. In some embodiments, the filtration devices of the present invention have an adsorption capacity for As(V) of about 10, 20, 30, 40, 50, 60, 70, 80, 90, 100, 150, 200, 250, 500, 750, 1000, 1250, 1500, 2000 μg/g filter (or some range therebetween).

The filtration devices of the present invention effectively remove arsenate and/or arsenite, as well as many of the other contaminants described herein, from a fluid such as water, for many filter runs. The filtration device is preferably such that the contaminant level in the effluent fluid meets WHO guidelines. For a given filter and feed, the number of effective filtrative runs achievable is a function of filter thickness such that an equivalent 1-cm and 4-cm thick filter would achieve about 250 and 1000 effective filter runs, respectively). Effective filtrative runs generally refers to the number of runs such that the effluent concentration is below a health guideline (e.g., WHO, EPA, etc.), with the end of effective runs to indicate when that effluent concentration breaks through the filter, meaning the effluent concentration is greater than the health guideline. A 2-cm thick sample is used to normalize the data, which is similar to the thickness of a typical pot filter.

In one aspect, the filtration devices of the present invention are able to effectively remove As(III) from contaminated water having As(III) concentrations of 500 μg/L or less at an effluent concentration of 10 μg/L or less for up to about 50, 100, 200, 250, 300, 400, 450, 500, 550, 600, 650, 700, 750, 800, 850, 900, 950, and even 1000 or more effective filtrative runs (or some range therebetween). In another aspect, the filtration devices of the present invention are able to effectively remove As(V) from contaminated water having As(V) concentrations of 500 μg/L or less at an effluent concentration of 10 μg/L or less for up to about 50, 100, 200, 250, 300, 400, 450, 500, 550, 600, 650, 700, 750, 800, 850, 900, 950, and even 1000 or more effective filtrative runs (or some range therebetween).

In another aspect, the filtration devices of the present invention are able to effectively remove cadmium (Cd) from contaminated water having Cd concentrations of 500 μg/L or less at an effluent concentration of 3 μg/L or less for up to about 50, 100, 200, 250, 300, 400, 450, 500, or more effective filtrative runs (or some range therebetween).

In another aspect, the filtration devices of the present invention are able to effectively remove copper (Cu) from contaminated water having Cu concentrations of 10,000 μg/L or less at an effluent concentration of 2,000 μg/L or less for up to about 20, 30, 40, 50, 60, 70, 80, 90 or 100 or more effective filtrative runs (or some range therebetween).

In another aspect, the filtration devices of the present invention are able to effectively remove fluoride (F) from contaminated water having fluoride concentrations of 20,000 μg/L or less at an effluent concentration of 1500 μg/L or less for up to about 50, 100, 200, 250, 300, 400, 450, 500 or more effective filtrative runs (or some range therebetween).

In another aspect, the filtration devices of the present invention are able to effectively remove chromium (Cr) from contaminated water having Cr concentrations of 1000 μg/L or less at an effluent concentration of 50 μg/L or less for up to about 50, 100, 200, 250, or 300 or more effective filtrative runs (or some range therebetween).

In another aspect, the filtration devices of the present invention are able to effectively remove lead (Pb) from contaminated water having Pb concentrations of 100 μg/L or less at an effluent concentration of 10 μg/L or less for up to about 50, 100, 200, 250, 300, 400, 450, 500, or more effective filtrative runs (or some range therebetween).

In another aspect, the filtration devices of the present invention are able to effectively remove nickel (Ni) from contaminated water having Ni concentrations of 500 μg/L or less at an effluent concentration of 70 μg/L or less for up to about 50, 100, 200, 250, 300, 400, 450, 500, 600, 700, 800, 900, or 1000 or more effective filtrative runs (or some range therebetween).

In another aspect, the filtration devices of the present invention are able to effectively remove thallium (Tl) from contaminated water having Tl concentrations of 100 μg/L or less at an effluent concentration of 0.5 μg/L or less for up to about 50, 100, 200, 250, 300, 400, 450, 500, or more effective filtrative runs (or some range therebetween).

In another aspect, the filtration devices of the present invention are able to effectively remove oxyanions of selenium (Se) from contaminated water having Se concentrations of 500 μg/L or less at an effluent concentration of 40

µg/L or less for up to about 20, 30, 40, 50, 60, 70, 80, 90, or 100 or more effective filtrative runs (or some range therebetween).

It will be appreciated to those skilled in the art that for a given filtration device, the effectiveness of removing contaminants will depend upon the overall composition of the fluid being filtered because some contaminants will have a higher specificity and binding affinity for the filter than other contaminants. Further, for a given filtration device, the concentration of the contaminant in fluid will affect the number of runs to breakthrough. Thus, the foregoing description is intended to be exemplary only and non-limiting.

The filtration device of the present invention is also able to be regenerated by desorbing the contaminants absorbed by the device. In one aspect, the filtration device is exposed to a regenerating fluid having a basic pH, preferably above about 10, 10.5, 11, 11.5, 12, 12.5 or more. The regenerating fluid having the basic pH is preferably fluid that has been purified to remove most contaminants. For example, water that has been purified using the filtration device of the present invention can be pH-adjusted to be above about 10 and can then be used as a regenerating fluid. In another aspect, the filtration device is exposed to a regenerating fluid having an acidic pH, preferably below about 4, 3, 2, 1, or less. The filtration device may be sold or otherwise distributed with the regenerating fluid as part of a kit. The kit may include instructions to have the user pass the regenerating fluid through the filtration device on a predetermined schedule, e.g., weekly, bimonthly, monthly, etc. The desired predetermined schedule may depend upon the composition of the water in the geographical area of the world. That is, in regions in which the contaminant levels are generally high, the predetermined schedule for regeneration may be more frequent compared to other regions. Such a schedule can be readily determined by those skilled in the art.

The present invention is further illustrated with non-limiting examples described below. In the examples, the coated monolithic porous filter element is often referred to as a surface modified ceramic filter ("SMCF").

In the following examples, a point-of-use water treatment technology comprising a monolithic porous ceramic filter was used to simultaneously treat biological and chemical contaminants including arsenic. The design studied involved a conventional porous ceramic filter coated internally with amorphous iron-oxide coating. Specific objectives of this work included developing the filter and coating to optimize arsenic removal for both As(III) and As(V), determine removal of other heavy metals, determine impacts of water quality (e.g., pH, natural organic matter ("NOM"), etc.) on adsorption, and confirm disinfection capabilities of the ceramic filter after iron oxide coating.

Materials and Methods

Materials.

Ceramic filters for laboratory testing were manufactured from different clays, sawdust, and water according to standard ceramic filter protocols. See Potters for Peace, Factory Startup Manual: For the Production of Ceramic Water Filters, (2005) (available at. http://pottersforpeace.org/wp-content/uploads/production-manual-iraq.pdf). A majority of the testing was conducted using a common 200-mesh (about 75 micron) redart pottery clay (Resco Products, Pittsburgh, Pa.) used for ceramic filters with a mineralogy of about 40% illite, about 27% chlorite, about 28% quartz (and with a chemistry of about 61% silica and about 18% alumina). Selected experiments were conducted with a Maryland Natural Clay (Stancills, Md.) with a mineralogy of about 46% kaolinite, about 21% mica, about 25% quartz, and about 8% K-feldspar (and with a chemistry of about 52% silica and about 21% alumina). The burnout material used was 30-mesh-sieved sawdust (600 µm nominal) mixed into the clay at about 27% by volume to create the porous pore structure after firing providing sufficient water flow rates with effective bacterial filtration. Small fines were not removed with a smaller sieve, thus providing a broader pore-size distribution.

As(III) and As(V) stock solutions were prepared frequently from reagent grade sodium arsenite ($NaAsO_2$; Fisher Scientific, St. Louis, Mo.) and sodium arsenate ($HAsNa_2O_4$; Sigma Aldrich, St. Louis, Mo.). $Na_2SeO_4$, $CdCl_2$, $CrNa_2O_4$, and $CuCl_2$ were purchased from Acros Organics (New Jersey). Ferric nitrate ($Fe(NO_3)_3$ (MP Biomedicals) was used to prepare the iron-oxide coating on the ceramic filters. Colloidal silver was purchased from Argenol Laboratories (Spain) and mixed into a 0.023% (as Ag) suspension used to coat selected filters following specifications by Potters For Peace. See Potters for Peace, Colloidal silver mixing, (2006) (available at http://s189535770.onlinehome.us/pottersforpeace/wp-content/uploads/colloidal-silvermixing.pdf).

Lab water (18 MΩ-cm) was produced using a Milli-Q (MilliPore Model Direct-Q) water system. Natural water was collected from Clinton Reservoir in Douglas County, Kans. (USA) for experiments examining competitive effects. Natural water was also collected from Potters Lake in Lawrence, Kans. (USA) for experiments confirming bacteriological removal effectiveness of the coated filters.

Analytical Methods.

Arsenic concentrations were determined using a Varian Spectra AA 240 graphite furnace atomic absorption ("GFAA") spectrophotometer equipped with a GTA 100 graphite-tube analyzer and programmable sample dispenser. Verification of arsenic speciation in the influent solutions was performed by ion chromatography ("IC") analysis using a Dionex ICS-2000 with an IonPac AS 18 anion exchange column (Dionex). A KOH gradient of 6-52 mM in 15 min at a 1 mL/min flowrate was used as the eluent. Iron concentrations in the filtered effluent were determined using Hach Iron TNT 858 method. pH was determined using an Accument Basic pH meter (Model AB15; Fisher Scientific). The total calcium hardness and alkalinity of the Clinton Lake water were determined using Hach digital titrator kits using Hach Methods 8329 and 8203, respectively. Phosphate ($PO_4$-P) concentration in the natural water was determined using Hach Phosphorus TNT 843 method using a DR 5000 spectrophotometer ("HACH"). Dissolved organic carbon ("DOC") was determined using a Teledyne Tekmar TOC Analyzer. Petri Film plates (3M, St. Louis, Mo.) were used to measure E. coli and total coliform counts in unfiltered and filtered natural water.

Physical properties of uncoated and coated ceramic filters were determined in the Leventis Research Laboratory at the Missouri University of Science and Technology (Rolla, Mo.). Specifically, skeletal density was determined using helium pycnometry using a Micromeritrics AccuPyc II 1340 (Norcross, Ga.). Surface areas and pore size distributions were determined using $N_2$-sorption porosimetry using a Micromeritics ASAP 2020 Surface Area and Pore Distribution Analyzer.

Example 1: Ceramic Filter Fabrication

A 73:27 (wt) clay:sawdust ratio was used in all filter experiments by mixing the 4.55 kg of the dry clay/sawdust mix with 3.6 L tap water and kneaded into a workable homogenous consistency. Full-size ceramic filters were pressed using a hydraulic press and mold. However, most experiments were conducted on 2.0 cm thick, 1.3 cm diameter ceramic plugs in column experiments to simulate filter performance at full scale to allow the testing of a wide range of filters and experimental conditions. The filters were air-dried for at least three days prior to firing in a Carbolite 3216 tube furnace in a ramp from 2° C. to a maximum of 900° C. where it was held for 6 hours before cooling.

The iron oxide coating on the ceramic filters was created for selected experiments in a process modified from sand coating procedures previously reported. See Benjamin et al., *Sorption and filtration of metals using iron-oxide-coated sand*, Water Res 30(11) 2609-2620 (1996); Thirunavukkarasu et al., *Arsenic removal from drinking water using iron oxide-coated sand*, Water Air Soil Poll 142(1) 95-111 (2003). Ferric nitrate coating solutions were prepared at different concentrations including 0.026, 0.128, 0.51, and 2.0 M (depending on the experiment) to test the effect of different iron coating mass and thicknesses. Specific iron mass was estimated based on dry weight gain, and iron oxide film thickness was estimated using mass and surface area estimates. Filters were saturated in two ways in initial studies with the ferric nitrate solution including extended submersion and mixing, and/or by passing the ferric nitrate solution through the plug under varied pressure using a syringe. Other methods using vacuum, varied agitation methods, and other techniques were also examined (including by coating with submersion on shaker tables for agitation for from 1 hour to 2 days, in ultrasonic baths to help displace trapped gas with coating fluid, and by using vacuum suction using a syringe to create suction). For applications where pressure of suction was used, the sides of the plug were encased with epoxy and polypropylene such that fluid could only enter or exit the plug through the ends. Coated filters were baked at 110° C. for 4 hours to remove the water, and then at 550° C. for 3 hours. The filters were then allowed to cool to room temperature, and then rinsed with lab water to remove any colloidal fines. The ferric iron coating procedure was then repeated a second time. Colloidal silver was coated on a subset of filters by submersion in a 200 mg/L (as Ag) solution for 2 minutes according the procedure recommended by Potters for Peace. No significant difference in metal removal was observed comparing SMCFs with and without colloidal silver addition. All of the results shown below are with SMCFs with colloidal silver.

Filter Characterization

The BET surface areas for each iron coating concentration increased non-linearly with coating solution strength due the creation of a significant microporous structure of up to 15.1% at the greater iron coating level (Table 1). Average pore size thus shifted downward from 22.5 nm for the uncoated ceramic to 9.7 nm for the highest coating level (Table 1). The porosity determined by water uptake of the uncoated and 1.0 M SMCF was measured to be 60% and 58%, respectively, or nearly unchanged. Hydraulic conductivity decreased by approximately 50% with increasing iron coating between the uncoated filter and the filter with the highest coating level (Table 1). The decreases in average pore diameter due to the iron-oxide coating would also likely improve microbial removal.

TABLE 1

Characterization of iron-oxide coated filters

| | Ferric nitrate coating solution strength (M) | | | | | |
|---|---|---|---|---|---|---|
| | 0 | 0.026 | 0.128 | 0.51 | 1.0 | 2.0 |
| Surface Areas | | | | | | |
| BET Surface Area ($m^2$ $g^{-1}$) (1.7-300 nm) | 1.57 | 2.33 | 3.07 | 3.95 | 10.08 | 9.77 |
| t-plot micropore area ($m^2$ $g^{-1}$) | 0 | 0 | 0.30 | 0.225 | 0.88 | 1.48 |
| Percent micropores (% t-plot micropore to BET total) (%) | 0 | 0 | 9.79 | 5.69 | 8.72 | 15.1 |
| Average Pore Diameter | | | | | | |
| BJH desorption average pore diameter (nm) | 22.5 | 19.7 | 12.5 | 14.8 | 12.7 | 9.7 |
| Hydrology Conductivity | | | | | | |
| Hydraulic Conductivity (cm/s) | 0.0103 | 0.0103 | 0.0102 | 0.008 | 0.0065 | 0.0049 |
| r (correlation coefficient) | 0.9772 | 0.9823 | 0.9738 | 0.9815 | 0.9823 | 0.9778 |
| Porosity | | | | | | |
| Porosity (%) | 060 | — | — | — | 58 | — | a: Filters were also coated with 0.023% colloidal silver
b: Measured by $N_2$ BET Example 2: Arsenic Adsorption Experiments Filtration System Filter plugs were encased using 10 mL Luer-lock syringes (BD, Franklin Lakes, N.J.) using epoxy adhesive on the sides so that no water could bypass the filter plug. Four eight-channel Minipulse 3 peristaltic pumps (Gilson) were used to continuously pump water through the ceramic plugs. The flowrate through the ceramic plugs of 1.48 mL/hr (0.0247 mL/min) was used to approximate the typical flowrate through a gravity-fed full-scale ceramic filter (or 4.4 L/hr) by scaling surface areas of the full-scale filter to the plug (of approximately 3000 filter-to-plug surface area ratio). A system of stainless steel hypodermic needles (Cadence Science, Cranston, R L), Tygon tubing (Masterflex, Kalamazoo, Mich.), and Luer fittings were used to pass solutions from the feed reservoirs, through the peristaltic pump, the filters, and finally into polypropylene test tubes in a Retriever II sample collector (ISCO, Lincoln, Nebr.). The sample collector was set to advance after a time (and volume) scaled to correspond to four filter runs.

The arsenic adsorption capacity of the SMCFs was tested under a wide range of coatings and conditions. Parameters studied included the effect of: (1) arsenic species (i.e., As(III) versus As(V)) in the feed solution; (2) iron coating solutions used to coat the filters of 0.026, 0.128, 0.51, and 2 M, the amount of iron coated on the filters are respectively 0.96, 4.81, 19.25, and 36.07 mg/g; (3) standard versus no colloidal silver; and (4) feed solutions in lab water versus natural water with high dissolved organic carbon ("DOC") of approximately 5 mg/L as carbon. As(III) and As(V) arsenic feed solutions were prepared at 250 μg/L in lab water buffered with 0.5 mM $HCO_3^-$ at a pH of 7.5 generally (or 6.0 or 9.0 in selected experiments).

Arsenic Adsorption in Laboratory Water

Example data are provided herein to demonstrate the As (III) and As (V) removal effectiveness of one embodiment of the SMCF. The ceramic plugs (filter) tested was prepared with a 73:27 (wt) redart clay: sawdust (30-mesh-sieved, 600 μm nominal) ratio dried then fired at a maximum temperature of 900° C. The filters were coated two separate times These results are very promising in that at one filtration per day at these conditions, the SMCF may easily operate for a year or more removing both As(III) and As(V) from very high levels (e.g., 250 μg/L) to below WHO guidelines of 10 μg/L. Comparison of filters with and without colloidal silver (as is sometimes coated on ceramic filters) showed no significant difference in capacity for As (data for non-colloidal silver coated SMCFs not shown).

The average specific adsorption was 21 and 29 mg As/mg iron for 10 and 50 μg/L breakthroughs for both As(III) and As(V) (data from Table 2). Only for As(III) for 50 μg/L breakthrough was there a significant ($\alpha=0.05$) trend of less iron oxide correlating with greater specific adsorption. It is hypothesized that as more layers of the iron-oxide surface form during the coating process, a smaller proportion of available sorption sites form.

TABLE 2

Adsorption capacities for As(III) and As(V)

| Ferric nitrate coating strength (M) | As species filtered | pH | As adsorbed at 10 μg/L BT (μg/g filter) | As adsorbed at 50 μg/L BT (μg/g filter) | Mass As/ mass Fe at 10 μg/L BT (μg/mg) | Mass As/ mass Fe at 50 μg/L BT (μg/mg) |
|---|---|---|---|---|---|---|
| 0 | As(III) | 7.5 | 0 | 0 | 0 | 0 |
| 0.026 | As(III) | 7.5 | 20 | 38 | 21 | 39 |
| 0.128 | As(III) | 7.5 | 115 | 160 | 24 | 33 |
| 0.51 | As(III) | 7.5 | 369 | 561 | 19 | 29 |
| 1.0 | As(III) | 7.5 | 562 | 631 | 21 | 23 |
| 2.0 | As(III) | 7.5 | 677 | 708 | 19 | 20 |
| 0 | As(V) | 7.5 | 0 | 0 | 0 | 0 |
| 0.026 | As(V) | 7.5 | 26 | 53 | 27 | 55 |
| 0.128 | As(V) | 7.5 | 77 | 119 | 16 | 25 |
| 0.51 | As(V) | 7.5 | 376 | 453 | 20 | 24 |
| 1.0 | As(V) | 7.5 | 597 | 631 | 22 | 23 |
| 2.0 | As(V) | 7.5 | 675 | 708 | 19 | 20 |
| 0.128 | As(III) | 6 | 77 | 108 | 16 | 22 |
| 0.128 | As(III) | 9 | 71 | 142 | 15 | 30 |
| 0.128 | As(V) | 6 | 124 | 207 | 26 | 43 |
| 0.128 | As(V) | 9 | 60 | 128 | 12 | 27 |
| 0.128 | As(III)* | 7.5 | 32 | 162 | 7 | 34 |
| 0.128 | As(V)* | 7.5 | 29 | 59 | 6 | 12 |
| 1.0 | As(III)* | 7.5 | 243 | 251 | 13 | 13 |
| 1.0 | As(V)* | 7.5 | 238 | 318 | 12 | 17 |
| 2.0 | As(III)* | 7.5 | 415 | 441 | 12 | 12 |
| 2.0 | As(V)* | 7.5 | 420 | 474 | 12 | 13 |

*Clinton Lake NOM Experiments with varied concentrations of ferric nitrate coating solution coated under variable pressure using a syringe, then backed at 110° C. (4 hours) followed by 550° C. (3 hours). The filters were coated with colloidal silver by submersion in a 200 mg/L (as Ag) Ag solution for 2 minutes.

The flowrate through the ceramic plugs of 1.48 mL/hr (0.0247 mL/min) was used to approximate the typical flowrate through a gravity-fed full-scale ceramic filter (or 4.4 L/hr). Each effective filter run was 8.67 mL based on proportional surface area for a 14.7 L filter (or approximately a one-day drinking water requirement for a family). For influent feed solutions containing 250 μg/L As(III), the filters coated with 0, 0.026, 0.128, 0.51, and 2.0 M ferric nitrate solution produced approximately 0, 20, 108, 360, and 666 equivalent filter runs, respectively, with effluent below the WHO guideline of 10 μg/L (FIG. 1A). For As(V), very similar results were observed as for As(III) (FIG. 1B). These results can be explained in terms of both increased BET surface area and total moles of iron on the filters which both correlated ($\alpha=0.05$) well with 10 and 50 μg/L breakthroughs for both As(III) and As(V) (data from Tables 1 and 2).

Effect of pH on Arsenic Adsorption

Figure 2:
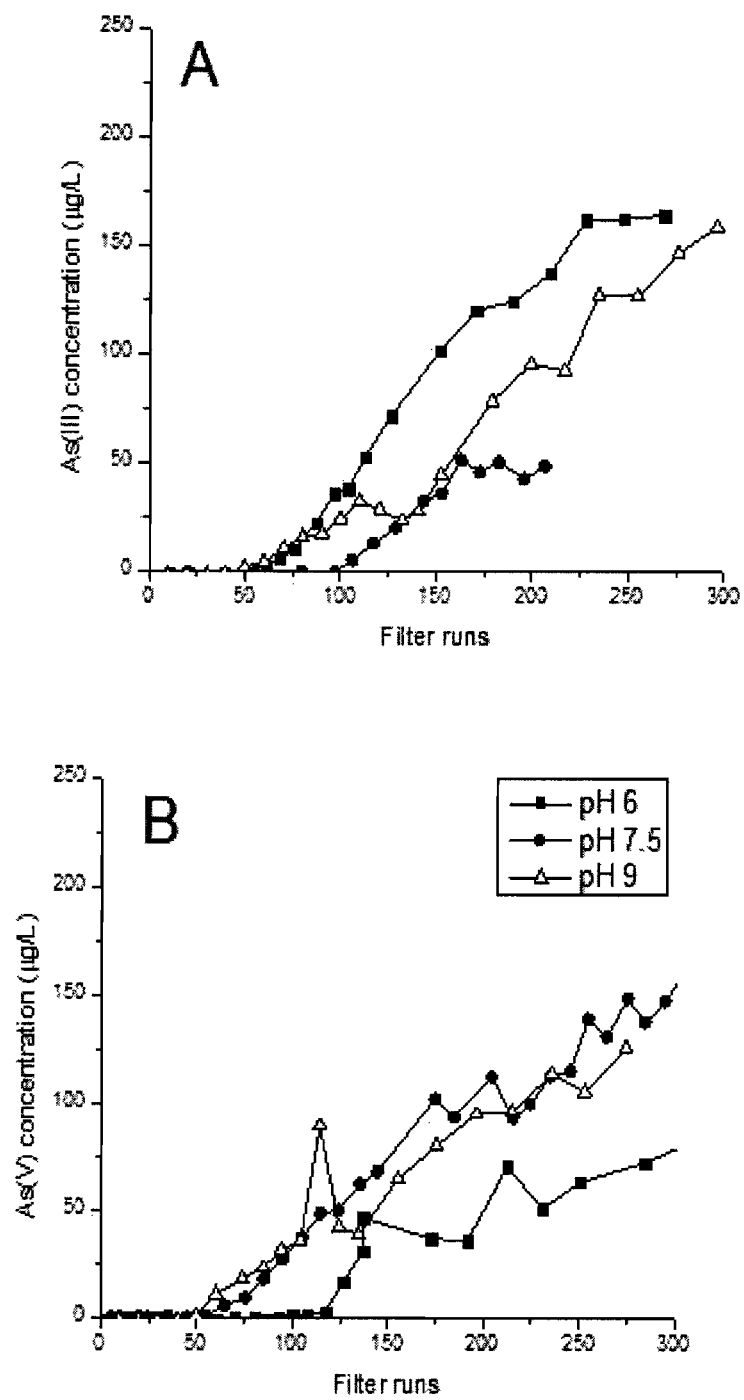
FIG. 2 shows the pH effects for As(III) (FIG. 2A) and As(V) (FIG. 2B) in lab water at pH 6.0, 7.5, and 9.0 with influent As concentrations of 250 µg/L on adsorption on 0.128 M iron coated filters (also coated with 200 mg/L colloidal silver).

To examine the effect of pH on adsorption, the sorption capacity for arsenic for the low-Fe, 0.128 M coated filters was tested at pH 6.0, 7.5, and 9.0 at otherwise the same conditions as described above. In the pH range from 6-9, As(III) exists primarily in the neutral $H_3AsO_3$ form, while As(V) exists primarily as the anionic mono- and di-valent $H_2AsO_4^-$ and $HAsO_4^{2-}$ species. Adsorption of the neutral As(III) was greatest at pH 7.5, and was less for pH 6 and 9 (FIG. 2A). Specifically, the capacity of the filter for As(III) at pH 6.0, 7.5, and 9.0 was 77, 115, and 71 ug As/g filter at 10 μg/L breakthrough (Table 2), or 74, 115, 79 effective filter runs (FIG. 2A). In contrast, the capacity of the filter for As(V) at pH 6.0, 7.5, and 9.0 was 124, 77, and 60 ug As/g filter at 10 μg/L breakthrough (Table 2), or 122, 77, and 59 effective filter runs (FIG. 2B). As pH increases from 6 to 9, the net surface charge of the iron oxide coating would tend to become more negative. Based on electrostatic sorption interactions, this should tend to decrease sorption of the increasingly anionic As(V) due to increased electrostatic repulsive forces (which is the result observed).

Arsenic Adsorption in Natural Water

As adsorption was studied in water from 0.45 μm filtered Clinton Lake (Lawrence, Kans., USA) containing 4.98 mg/L DOC, 113 mg/L as $CaCO_3$ calcium hardness, 141 mg/L as $CaCO_3$ total hardness, 159 mg/L as $CaCO_3$ alkalinity, 10.9 mg/L $Cl^-$, 1.52 mg/L $NO_3^-$—N, 1.3 mg/L $PO_4$—P, 36.7 mg/L $SO_4^{2-}$ and a pH of 7.5 (after adjustment from 8.3 using HCl). For the 0.51 and 2 M ferric nitrate coated filters, As(III) and As(V) adsorption capacity were both observed to decrease from 34% to 38% due to this relative high level of DOC for both As(III) and As(V) based on the 10 μg/L breakthrough threshold (Table 2).

Selected experiments were conducted in natural waters (prefiltered through a 0.45 μm glass fiber filter) with a calcium hardness, total hardness and alkalinity of 113, 141, and 159 mg/L as $CaCO_3$, respectively. The lake water contained 4.98 mg/L dissolved organic carbon, 10.9 mg/L $Cl^-$, 1.52 mg/L $NO_3^-$—N, 1.3 mg/L $PO_4$—P, 36.7 mg/L $SO_4^{2-}$. The pH of the natural water solutions was adjusted from 8.3 to 7.5 using either 10% HCl or 1 M NaOH prior to the experiments.

For these experiments, the lab water used for comparison was formulated to contain the same ion concentrations as the Clinton Lake water (sited above) such that the key difference was the NOM present. It is hypothesized that the impact of NOM on As sorption capacity was due to some combination of competition at adsorption sites and pore blockage by the NOM. This result shows that the SMCF may successfully remove both As(III) and As(V) from water with typical lake DOC levels for a significant period.

Example 3: Arsenic Desorption Experiments

The reversibility of the adsorption of As on the iron-coated filters for both reasons of safety (e.g., inadvertent release of As into filtered water) and regenerability of the filter (e.g., to be able to reuse filters after saturation) is important. In this example, filters loaded to 15% BT of arsenic were then switched to a feed of pure bicarbonate buffered water at pH 7.5. The pH of the feed solution was then adjusted either downwards or upwards at 1.0 pH unit intervals to pH 2.5 or 12.5, respectively. Four equivalent filter bed-volumes were collected at each pH unit. More specifically, to examine potential desorption of As(III) and As(V) from the filters, 0.51 M ferric nitrate coated filters were loaded to 15% BT (with an influent concentration of 250 μg/L) for desorption studies. The initial pH of the feed solutions was pH 7.5, which was then increased or decreased in one-pH-unit for a duration of four effective filter volumes.

Figure 3:
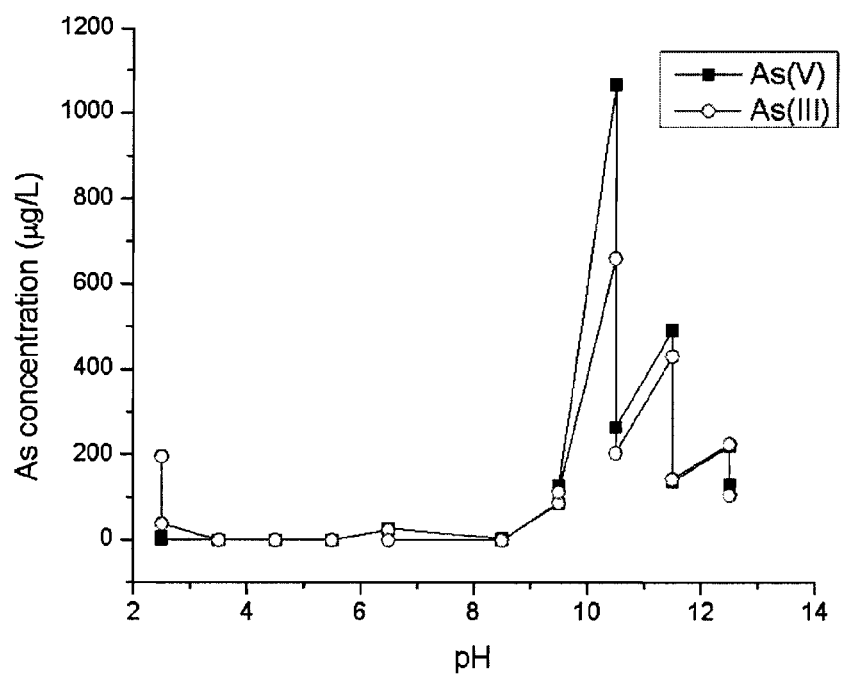
FIG. 3 shows the desorption of preloaded As(III) and As(V) at pH increments decreasing from 7.5 to 2.5 or increasing from 7.5 to 12.5 on 0.128 M iron coated filters (also coated with 200 mg/L colloidal silver).

The results showed that essentially no As desorbed from the filters between pH 3.5 and 8.5, with very limited desorption at pH 2.5 and 9.5 (FIG. 3). At pH 10.5 and above, however, significant desorption occurred for both As(III) and As(V). These results suggest that at high pH (e.g., greater than 10), sorption of As may be significantly diminished, and further that if a loaded filter were subjected to such high pH water, significantly elevated As levels could result. Further, these results suggest the possibility of regenerating filters once loaded at lower pH by treatment with caustic or lime. The need for regeneration, however, may be limited because the filtrative capacity may be exhausted at a similar time resulting in the advisability of simply discarding the filter.

Example 4: Bacterial Removal Efficiency

Because of the key importance of simultaneous filtrative disinfection along with As (and other heavy metal) removal, studies were conducted to confirm the retention of the disinfection capability of the SMCF. In this example, natural water from Potters Lake (Lawrence, Kans.) containing an average of 2 CFU/mL *E. coli* and 15 CFU/mL total coliforms was filtered. The bacterial removal effectiveness of the SMCFs was evaluated by filtering four equivalent filter volumes of natural water from Potter Lake with two SMCFs and colloidal silver. Filter influent and effluent samples were plated in triplicate on Petrifilm plates and incubated at 35±1° C. for 24 hours for total coliform enumeration and for 48 hours for *E. Coli* enumeration.

The results showed 100% removal of both *E. coli* and total coliforms was achieved when filtered through the SMCF tested (0.51 M). While the filters in this study were not subjected to vigorous microbial testing, these results indicate that the bacterial removal effectiveness of the Potters for Peace filter was not been reduced by the modifications performed to produce the SMCF. In fact, as the pore size was reduced by the iron coating, increased microbial filtration would be expected and was observed.

Example 5: Sorption of Other Metals

Other heavy metals in addition to As also cause health threats to people in developing and developed nations. Thus, in this example, the filters were tested for their ability to absorb other metals, specifically, cadmium ($Cd^{2+}$) from $CdCl_2$, chromate ($CrO_4^-$) from $CrNa_2O_4$, and copper ($Cu^{2+}$) from $CuCl_2$, and selenate ($SeO_4^{2-}$) from $Na_2SeO_4$. These experiments were conducted at pH 7.5 in lab water buffered with 0.50 mM $HCO_3^-$. Specifically, filters coated 0, 0.128, 0.51, and 2.0 M ferric nitrate were loaded with a mix of 3.34 μmol/L (each) of $SeO_4^{2-}$, $Cd^{2+}$, $CrO_4^-$ and $Cu^{2+}$ and $As^{5+}$ in pH 7.5 lab water.

Figure 4A:
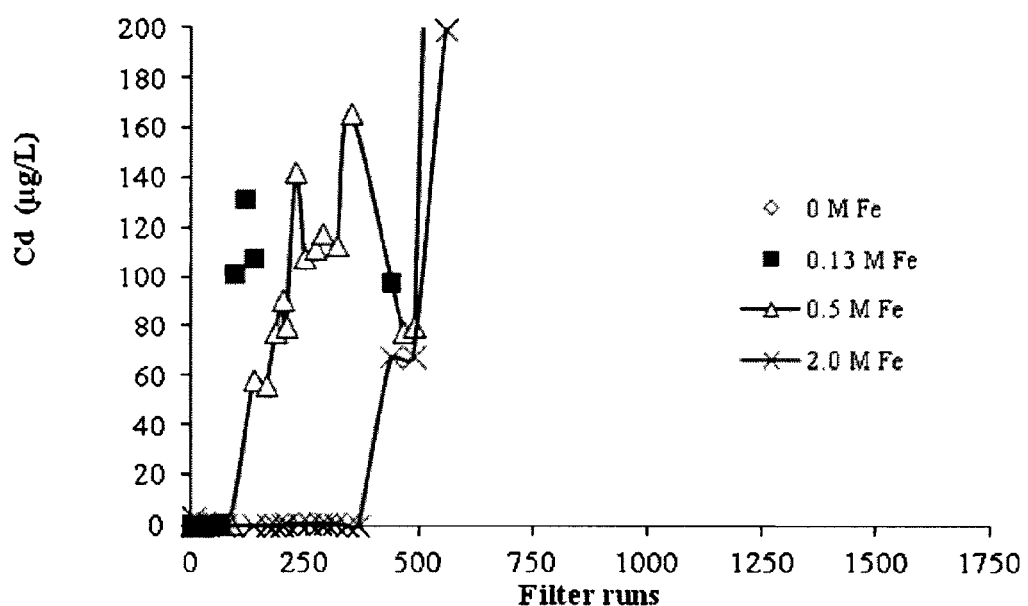
FIG. 4A-C shows the breakthrough curves for $Cd^{2+}$, $CrO_4^-$ and $Cu^{2+}$ for a mixture of $Cd^{2+}$, $CrO_4^-$, $Cu^{2+}$, $SeO_4^{2-}$ and with influent concentrations of 3.34 µmol/L each on 0, 0.128, 0.51, and 2 M iron coated filters at pH 7.4 in lab water. $SeO_4^{2-}$ was not well retained.
Figure 4B:
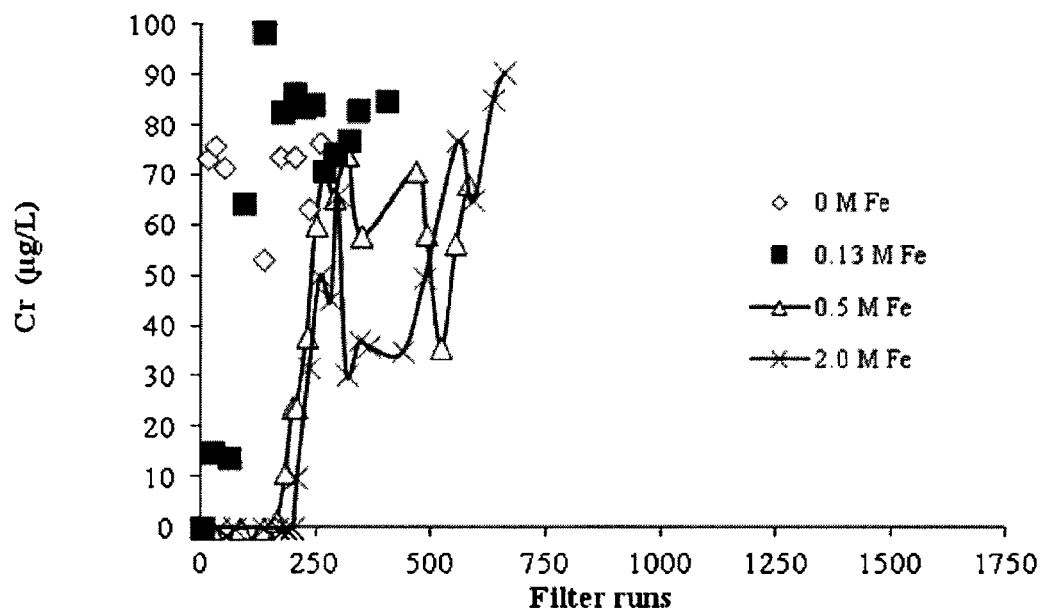
Figure 4C:
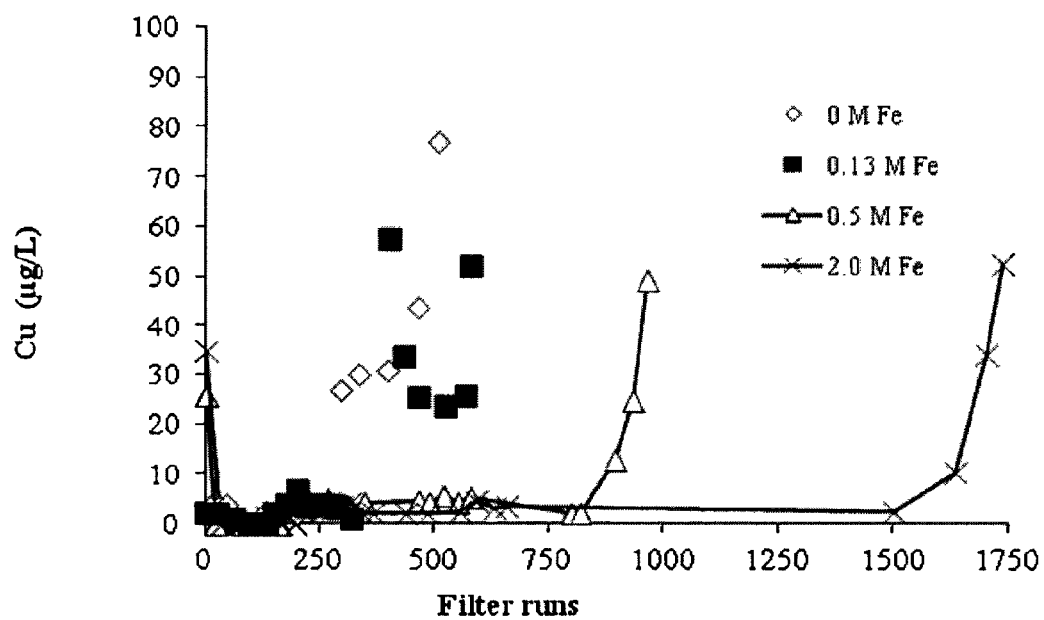

The results showed that the order of preference of the SMCFs for these metals was Cu>As>Cd>Cr>Se. Specifically, for the 2.0 M Fe-coated filter, Cu, As, Cd, and Cr reached 1480, 570, 364, and 207 effective filter runs prior to 10 μg/L breakthrough (with Se breaking through immediately) (FIG. 4). Because the metals were in a mixture, the filter capacity for each metal was diminished by adsorption of the other metals. Thus, the breakthrough curves are not directly comparable with the As(III) and As(V)-only experiments reported above. These results demonstrate that the SMCF is effective at removal of other heavy metals (including Cu, Cd, and Cr in this experiment) in addition to As, and current studies are focused on these and other systems. It is anticipated based on chemical similarity, and known sorption chemistry mechanisms, that a wide range of additional metals (and organics) will be removed in various embodiments (including the Fe-, Mn-, Al-based embodiments and mixtures).

Example 6: Investigation of Clay Types for Monolithic Porous Filter Element

In this example, the effect of clay type on the filter properties, including the capacities achievable for arsenic and other heavy metals, was demonstrated. It will be appreciated by those skilled in the art that a wide variety of clays with varied alumina, silica, and other inorganic content, and structure may be investigated in a like manner. Commonly used clay types for ceramic filters include redart clay, fire clay, natural clay, and many others which are generally combinations of montmorillonite-smectite, illite, kaolinite and chlorite.

Each clay type has subtle or pronounced differences in mineral content and structure. These differences affect the chemical and physical properties of the SMCF and are an important parameter in optimization for specific uses of the SMCF. The present invention encompasses all clay types and combinations as the porous monolithic structure of the filtration device.

As generally noted above, redart clay is reddish and very fine (e.g., about 200 mesh or 74 micron), with a high iron content. Fire clay and natural clay are coarser clays and are less prone to cracking during the manufacturing process and less dependent on moisture control. While the foregoing examples involved redart clay as the monolithic porous filter element, this example investigated a coarser Maryland Natural Clay (Stancills, Perryville, Md.) with a mineralogy of 46% kaolinite, 21% mica, 25% quartz, and 8% K-feldspar (and with a chemistry of 52% silica and 21% alumina). The filters were prepared with the same sawdust (30-mesh-sieved sawdust; or 595 µm); same clay:sawdust ratio (73:27 (wt) clay:sawdust); and with all other preparatory factors equivalent as for the redart clay used in the aforementioned experiments.

For samples that have reached breakthrough, preliminary limited results comparing redart clay with the natural Maryland Natural clay examined showed significant improvements in performance for the Maryland Natural clay versus the redart clay. For example, for the 0.51 M coated filter, a 27% and 30% improvement in capacity was achieved for As(III) and As(V), respectively, with Maryland Natural versus redart clay (see Table 3). For the 0.128 M coated filter, a 410 and 428% improvement in capacity was achieved for As(III) and As(V), respectively, with Maryland Natural versus redart clay (see Table 3). None of the other samples have broken through to date in these ongoing experiments.

500 µg/L (compared with World Health Organization guideline of 10 µg/L) using a 1-M iron-coated redart clay SMCF prepared as described above. The initial results comparing 500 versus 250 µg/L feed show that the effective bed filter runs were 85 and 90 percent greater at the 50% lower concentration, a nearly linear increase in filter runs. Halving the feed concentration again to 125 µg/L has to date caused the effective runs to breakthrough to significantly increase further (see Table 4) (although the experiments have not reach the full 1200 effective filter runs where breakthrough is expected).

These results demonstrate that the effective life of the SMCF can be estimated and communicated to a user based on the influent concentration and water quality.

TABLE 4

Effective runs to arsenic breakthrough from a 1M as a function of influent arsenic concentration in lab water

| | Runs to breakthrough | | | |
|---|---|---|---|---|
| | 125 | 250 | 500 | ug/L As in feed |
| As (III) | >950[1] (>324%)[1] | 542 (185%) | 293 (100%) | |
| As (V) | >956[1] (>314%)[1] | 580 (191%) | 304 (100%) | |

[1]Experiment still running with no arsenic breakthrough

Example 8: Fluoride Filtration

In this example, experiments were run on a variety of SMCF designs to develop effectiveness for removal of fluoride (F). A key issue with F removal is the very high influent concentrations (e.g., 10 mg/L or 10,000 µg/L)

TABLE 3

Comparison of iron coated SMCF effective filter runs for redart versus natural (Maryland) clay

| | Effective filter runs until arsenic breakthrough | | | | | | | |
|---|---|---|---|---|---|---|---|---|
| | Lab water | | | | Natural water | | | |
| | Redart Clay | | Maryland Natural Clay | | Redart Clay | | Maryland Natural Clay | |
| Iron coating (M) | As(III) | As(V) | As(III) | As(V) | As(III) | As(V) | As(III) | As(V) |
| 0 | 0 | 0 | 0 | 0 | 0 | 0 | 0 | 0 |
| 0.128 | 105 | 84 | >65 (running)[1] | >67 (running)[1] | 40 | 40 | 164 | 171 |
| 0.51 | 380 | 375 | 481 | 496 | 238 | 244 | >36 (running)[1] | >50 (running)[1] |
| 1 | 542 | 580 | >534 (running)[1] | >408 (running)[1] | 325 | 366 | >259 (running)[1] | >352 (running)[1] |
| 2 | 666 | 670 | — | — | 415 | 420 | — | — |

[1]Experiment still running with no arsenic breakthrough

Example 7: Filter Life Expectations Based on Influent Concentrations

The effective life of the SMCF for arsenic (and other metals) removal (as defined as the time or volume of water treated prior to breakthrough at a health guideline) is a function of the influent concentration of the contaminant (as well as other constituents and water quality factors). It was hypothesized that for a given water quality, the total mass of arsenic removed should be approximately constant for a given filter such that higher concentrations in the influent will lead to nominally linearly proportional shorter number of effective filter runs.

To test this hypothesis, tests are ongoing with varied influent As(III) and As(V) concentrations of 125, 250, and relative to concentrations of concern for heavy metals (e.g., 20-500 µg/L). A target treated water F concentration would nominally be about 1 mg/L F (approximately the concentration added to drinking water to protect from dental caries (cavities)) to 1.5 mg/L (the WHO health guideline). At higher concentrations, teeth mottling and debilitating skeletal fluorosis can occur with chronic use.

The implication is that the mass of F per volume of water treated is nominally 100 times greater in many cases for F than for typical heavy metal treatment applications (e.g., for As). This results in many fewer effective bed volumes treatable per filter, and the desirability to be able to reuse the filters many times after regeneration. This is what is currently being developed, and for which successful preliminary results have been achieved.

Figure 5:
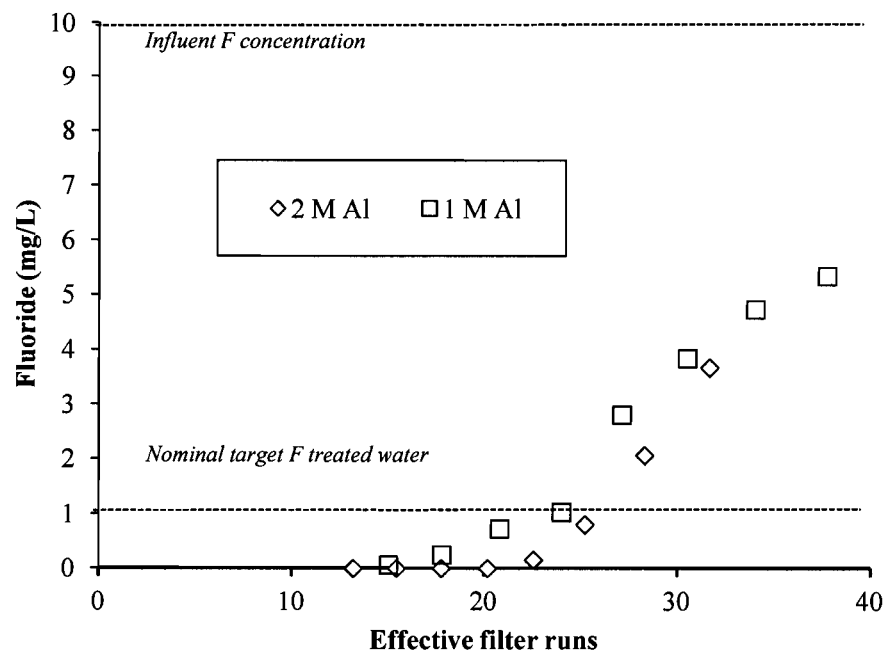
FIG. 5 shows the fluoride breakthrough curves for filtration devices coated with 1 or 2 M aluminum coating with an influent of 10 mg/L fluoride (10,000 µg/L fluoride). The results show an approximately 24 to 26 effective filter runs prior to exceeding a safe level of 1 mg/L fluoride.

Preliminary results shown below are for a Al—Fe (aluminum-iron) coated SMCF for F removal. In these experiment, a 1- or 2-M each mixture of 1 M $Al(NO_3)_3 \cdot 9H_2O$ and $Fe(NO_3)_3(9H_2O$ was used to coat redart clay SMCFs prepared as described above. After coating with the Al/Fe mixture, the filters were heated to 100° C. for 2 hours, recoated, and allowed to dry in air for 2 hours, and then baked again at 100° C. for 2 hours, followed by annealing at 600° C. for 3 hours. For a solution with 10 mg/L F in the influent, approximately 24 and 26 effective filter runs were achieved with 1 and 2 M Al—Fe coatings at pH 8, respectively (see FIG. 5). This would equate to nearly a one month of use with one filter run per day. It would be expected, and will be demonstrated, that greater or lesser effective number of filter runs will be achieved with proportionately lower and higher influent F concentrations.

Figure 6:
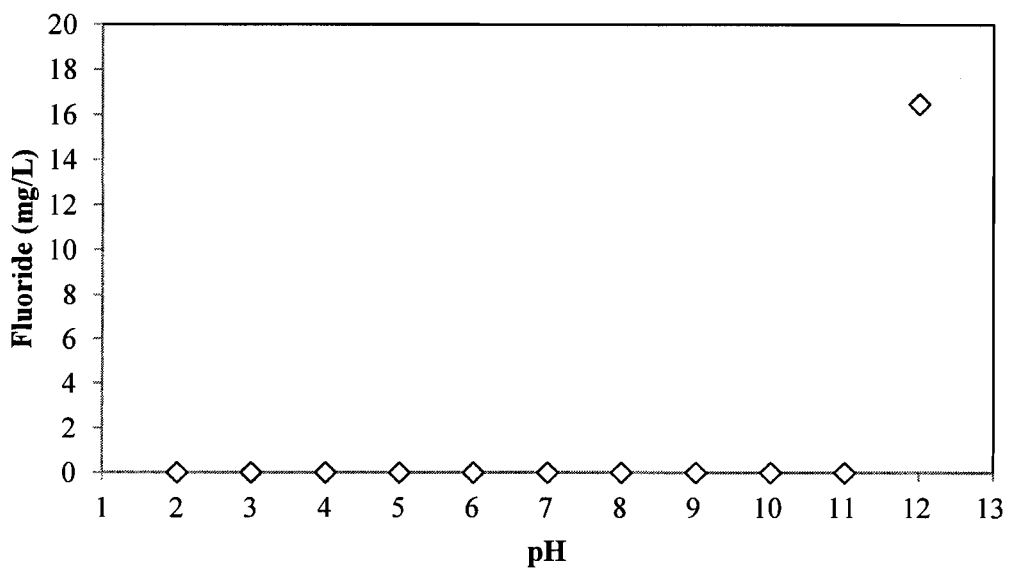
FIG. 6 shows the fluoride desorption results from fluoride-loaded, Al—Fe-coated filtration devices as a function of pH showing fluoride strong retained at pH 2 to 11, and easily desorbed at pH 12.

It is desired to be able to reuse this filters from many filter runs (e.g., up to 10-50 times) by regenerating the filter periodically. Initial studies show that for the Al—Fe SMCF tested, the F was desorbed and cleaned out of the filter by passing water with a pH of 12 through it (see FIG. 6). Experiments are now ongoing to determine how many times a Al—Fe SMCF can be reused. Additionally, optimal coatings (Al, Al—Fe, and other) will be developed to optimize the F removal and SMCF regeneration characteristics.

All publications, patents, patent applications, databases, and other references cited in this application are herein incorporated by reference in their entirety as if each individual publication, patent, patent application, database, or other reference were specifically and individually indicated to be incorporated by reference.

Ahsan et al., *Arsenic Exposure from Drinking Water and Risk of Premalignant Skin Lesions in Bangladesh: Baseline Results from the Health Effects of Arsenic Longitudinal Study*, Amer J of Epidemiology 163(12) 1138-1148 (2006).

APHA (American Public Health Association), AWWA (American Water Works Association), and WEF (Water Environment Federation), *Standard Methods for the Examination of Water and Wastewater*, 21st ed., Method 1030C: Method Detection Level. Washington, D.C.: American Public Health Association (2005).

Benjamin et al., *Sorption and filtration of metals using iron-oxide-coated sand*, Water Research 30(11) 2609-2620 (1996).

Bielefeldt et al., *Removal of virus to protozoan sized particles in point-of-use ceramic water filters*, Water Research 44(5) 1482-1488 (2010).

Bielefeldt et al., *Bacterial treatment effectiveness of point-of-use ceramic water filters*, Water Research 43(14) 3559-3565 (2009).

Bissen et al., *Arsenic—a Review. Part I: Occurrence, Toxicity, Speciation, Mobility*, Acta hydrochimica et hydrobiologica 31(1) 9-18 (2003).

Brookins, *pH-Eh Diagrams in Geochemistry*, Berlin Spring (1988).

Brown, *Effectiveness of ceramic filtration for drinking water treatment in Cambodia*, University of North Carolina at Chapel Hill, Chapel Hill (2007).

Brown et al., *Local Drinking Water Filters Reduce Diarrheal Disease in Cambodia: A Randomized, Controlled Trial of the Ceramic Water Purifier*, Am J Trop Med Hyg 79(3) 394-400 (2008).

Brown et al., *Use of Ceramic Water Filters in Cambodia*, Washington D.C. World Bank (2007).

Checkley et al., *Effect of water and sanitation on childhood health in a poor Peruvian peri-urban community*, The Lancet 363(9403) 112-118 (2004).

Clasen et al., *Interventions to Improve Water Quality for Preventing Diarrhoea: Systematic Review and Meta-Analysis*, British Medical Journal 334(7597) 782-785 (2007).

Clasen et al., *Reducing diarrhea through the use of household-based ceramic water filters: a randomized, controlled trial in rural Bolivia*, Am J Trop Med Hyg 70(6) 651-657 (2004).

Water Treatment: Principles and Design, 2nd ed. Revised by Crittenden et al., MWH New York: John Wiley & Sons (2005).

Dixit et al., *Comparison of Arsenic(V) and Arsenic(III) Sorption onto Iron Oxide Minerals: Implications for Arsenic Mobility*, Environmental Science & Technology 37(18) 4182-4189 (2003).

Edwards et al., *Adsorptive Filtration Using Coated Sand: A New Approach for Treatment of Metal-Bearing Wastes*, Research Journal of the Water Pollution Control Federation 61(9) 1523-1533 (1989).

Elliott et al., *Reductions of E. coli, echovirus type 12 and bacteriophages in an intermittently operated household-scale slow sand filter*, Water Research 42(10-11) 2662-2670 (2008).

Engineers Without Borders University of North Carolina—Chapel Hill; Dey Ut, Cambodia: *Rainwater Catchment System*, Retrieved from: http://studentorgs.unc.edu/ewb/index.php/completed-projects/58-completed/61-dey-ut-cambodia-rainwater-catchment-system.html Accessed: March 2011 (2011).

Esrey et al., *Interventions for the control of diarrhoeal diseases among young children: improving water supplies and excreta disposal facilities*, Bulletin of the World Health Organization 63(4) 757-772 (1985).

Fewtrell et al., *Water, sanitation, and hygiene interventions to reduce diarrhoea in less developed countries: a systematic review and meta-analysis*, The Lancet Infectious Diseases 5(1) 42-52 (2005).

Frazer, *Metal Attraction An Ironclad Solution to Arsenic Contamination?* Environmental Health Perspectives 113 (6) A399-A401 (2005).

Goldberg et al., *Mechanisms of Arsenic Adsorption on Amorphous Oxides Evaluated Using Macroscopic Measurements, Vibrational Spectroscopy, and Surface Complexation Modeling*, Journal of Colloid and Interface Science 234(1) 204-216 (2001).

Guerrant et al., *Updating the DALYs for diarrhoeal disease*, Trends in Parasitology 18(5) 191-193 (2002).

Gupta et al., *Arsenic Removal by Adsorption*, Journal (Water Pollution Control Federation) 50(3) 493-506 (1978).

Hunter, *Household Water Treatment in Developing Countries: Comparing Different Intervention Types Using Meta-Regression*, Environ Sci & Tech 43(23) 8991-8997 (2009).

Hussam et al., *A simple and effective arsenic filter based on composite iron matrix: Development and deployment studies for groundwater of Bangladesh*, J of Environ Sci and Health Part A: Toxic/Hazardous Substances and Environmental Engineering 42(12) 1869-1878 (2007).

International Agency for Research on Cancer (IARC), *Arsenic in Drinking Water*, 84 39 (2004). Retrieved from: http://www.inchem.org/documents/iarc/vol84/84-01-arsenic.html. Accessed: March 2011.

Jang et al., *Removal of Arsenite and Arsenate Using Hydrous Ferric Oxide Incorporated into Naturally Occurring Porous Diatomite*, Environ Sci & Tech 40(5) 1636-1643 (2006).

Jessen et al., *Sorption and Desorption of Arsenic to Ferrihydrite in a Sand Filter*, Environ Sci & Tech 39(20) 8045-8051 (2005).

Ko et al., *Arsenic Removal by a Colloidal Iron Oxide Coated Sand*, Journal of Environmental Eng 133(9) 891-898 (2007).

Kosek et al., *The global burden of diarrhoeal disease, as estimated from studies published between 1992 and 2000*, Bulletin of the World Health Organization 81(3) 197-204 (2003).

Kundu et al., *Analysis and modeling of fixed bed column operations on As(V) removal by adsorption onto iron oxide-coated cement (IOCC)*, Journal of Colloid and Interface Sci 290(1) 52-60 (2005).

Kundu et al., *Arsenic adsorption onto iron oxide-coated cement (IOCC): Regression analysis of equilibrium data with several isotherm models and their optimization*, Chemical Engineering Journal 122(1-2) 93-106 (2006).

Lantagne, *Investigation of the Potters for Peace colloidal silver impregnated ceramic filter—Report 1: Intrinsic Effectiveness*, Alethia Environmental, Allston, Mass. (2001a).

Lantagne, *Investigation of the Potters for Peace colloidal silver impregnated ceramic filter—Report 2: Field Investigations*: Alethia Environmental, Allston, Mass. (2001b).

Leupin et al., *Arsenic Removal from Bangladesh Tube Well Water with Filter Columns Containing Zerovalent Iron Filings and Sand*, Environ Sci & Tech 39(20) 8032-8037 (2005).

Li et al., *Preparation of iron-oxide coated porous ceramics filter and adsorption and degradation on methylene blue*, Advanced Material Research 97-101 1285-1289 (2010).

Liu et al., *Arsenic Sequestration in Iron Plaque, Its Accumulation and Speciation in Mature Rice Plants (Oryza Sativa L.)*, Environ Sci & Tech 40(18) 5730-5736 (2006).

Maiti et al., *Removal of As(V) using iron oxide impregnated carbon prepared from Tamarind hull*, J Environmental Science & Health, Part A: Toxic/Hazardous Substances & Environmental Engineering 45(10) 1203-1212 (2010).

Manceau, *The mechanism of anion adsorption on iron oxides: Evidence for the bonding of arsenate tetrahedra on free Fe(O, OH)6 edges*, Geochimica et Cosmochimica Acta 59(17) 3647-3653 (1995).

Meng et al., *Combined effects of anions on arsenic removal by iron hydroxides*, Toxicology Letters 133(1) 103-111 (2002).

Michon et al., *Optimization of a GFAAS method for determination of total inorganic arsenic in drinking water*, Talanta 71(1) 479-485 (2007).

Mintz et al., *Not just a drop in the bucket: expanding access to point-of-use water treatment systems*, American Journal of Public Health 91(10) 1565-1570 (2001).

Mukherjee et al., *Arsenic contamination in groundwater: a global perspective with emphasis on the Asian scenario*, J Health Population and Nutrition 24(2) 142(122) (2006).

National Research Council (NRC), *Arsenic in Drinking Water*, Washington D.C. National Academy Press (1999).

National Research Council (NRC), *Arsenic in Drinking Water: 2001 Update*, Washington D.C.: National Academy Press (2001).

Oyanedel-Craver et al., *Sustainable Colloidal-Silver-Impregnated Ceramic Filter for Point-of-Use Water Treatment*, Environ Sci & Tech 42(3) 927-933 (2007).

Potters for Peace, *Factory Startup Manual: For the Production of Ceramic Water Filters*, retrieved from: http://pottersforpeace.org/wp-content/uploads/production-manual-iraq.pdf (2005) Accessed: June 2010.

Potters for Peace, *Colloidal silver mixing*, Retrieved from: http://s189535770.onlinehome.us/pottersforpeace/wp-content/uploads/colloidal-silver-mixing.pdf (2006) Accessed: June 2010.

Pierce et al., *Adsorption of arsenite on amorphous iron hydroxide from dilute aqueous solution*, Environmental Science & Technology 14(2) 214-216 (1980).

Ratnaike, *Acute and chronic arsenic toxicity*, Postgraduate Medical Journal 79(933) 391-396 (2003).

Raven et al., *Arsenite and Arsenate Adsorption on Ferrihydrite: Kinetics, Equilibrium, and Adsorption Envelopes*, Environmental Science & Technology 32(3) 344-349 (1998).

Robins et al., *Removal of arsenic from drinking water by precipitation, adsorption or cementation*, in Ahmed et al., eds. Technologies for Arsenic Removal from Drinking Water (pp. 31-42) (2001). Retrieved from: http://www.un-u.edu/env/Arsenic/Robins.pdf. Accessed: June 2010.

Safe Water Today, *Safe Water Today: Together We Can, Together We Do* (2009). Retrieved from: http://www.safewatertoday.org. Accessed: June 2010.

Sarkar et al., *Arsenic Removal from Groundwater and Its Safe Containment in a Rural Environment Validation of a Sustainable Approach*, Environmental Science & Technology 42(12) 4268-4273 (2008).

Schmidt et al., *Household Water Treatment in Poor Populations: Is There Enough Evidence for Scaling up Now?* Environmental Science & Technology 43(4) 986-992 (2009).

Sherman et al., *Surface complexation of arsenic(V) to iron (III) (hydr)oxides: structural mechanism from ab initio molecular geometries and EXAFS spectroscopy*, Geochimica et Cosmochimica Acta 67(22) 4223-4230 (2003).

Sobsey, *Managing Water in the Home: Accelerated Health Gains from Improved Water Supply* (2002) from http://www.whoint/water_sanitation health/dwq/wsh0207/en/.

Sobsey et al., *Point of Use Household Drinking Water Filtration: A Practical, Effective Solution for Providing Sustained Access to Safe Drinking Water in the Developing World*, Environmental Science & Technology 42(12) 4261-4267 (2008).

Thirunavukkarasu et al., *Arsenic Removal from Drinking Water using Iron Oxide-Coated Sand*, Water, Air, & Soil Pollution 142(1), 95-111 (2003).

Thornton et al., *The geochemistry of arsenic*, in C. O. Abernathy, R. L. Calderon & W. R. Chappell, eds. Arsenic: Exposure and health effects (pp. 429) London: Chapman & Hall (1997).

van Riemsdijk et al., *Metal ion adsorption on heterogeneous surfaces: Adsorption models*, Journal of Colloid and Interface Science 116(2), 511-522 (1987).

Vertacnik, Personal Communication, Associate Professor of Ceramics in the Department of Visual Arts, University of Kansas, Lawrence, Kans. (2010).

WHO (World Health Organization), Diarrhoeal disease fact sheet N° 330 (2009), retrieved from: http://wwvv.who.int/mediacentre/factsheets/fs330/en/index.html. Accessed: June 2011.

WHO and UNICEF (United Nations Childrens Fund), *Progress on Sanitation and Drinking Water: 2010 Update*, Geneva: World Health Organization (2010).

Yanez, *Affordable impregnated colloidal-silver ceramic water purifier for low income communities*, Master of Science thesis for the degree of M.S. in Environmental Science, Department of Civil, Environmental, and Architectural Engineering, University of Kansas, Lawrence, Kans. (2009).

From the foregoing it will be seen that this invention is one well adapted to attain all ends and objectives hereinabove set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A monolithic porous filtration device for purifying water contaminated with one or more inorganic metals, said device comprising:
    a monolithic porous filter element having a thickness of greater than 0.5 cm, said monolithic porous filter element comprised of a clay article having a plurality of pores; and
    a metal coating applied to greater than 40% of a surface area of the pores of the filter element, wherein said metal coating comprises (1) iron and at least one or more of manganese, aluminum, titanium, or combinations thereof; or (2) manganese, aluminum, titanium or combinations thereof.

2. The device of claim 1 wherein said monolithic porous filter element is in the shape of a pot, cup, tube, cylinder, disk, box, or bucket.

3. The device of claim 1 wherein said monolithic porous filter element is prepared by forming a mixture of clay and a combustible material, and firing said mixture until said monolithic porous filter element is formed.

4. The device of claim 3 wherein said mixture comprises about 20% to about 90% by weight clay and about 10% to about 80% by weight combustible material.

5. The device of claim 1 wherein said monolithic porous filter element has a pore size of about 10 nm to about 2000 micron.

6. The device of claim 1 wherein said monolithic porous filter element comprises a clay selected from the group consisting of redart clay, natural clay, kaolinites, montrinorillonites, smectites, illites, and chlorites.

7. The device of claim 1, wherein said coating further comprises silver.

8. The device of claim 1 wherein said coating is selected from the group consisting of a Mn coating, an Al coating, a $TiO_2$ coating, an Fe/silver coating, an Fe/Al coating, an Fe/Mn coating, an Fe/titanium coating, an Fe/Al/Mn coating, and an Mn/Al coating.

9. The device of claim 1, wherein the coating comprises elemental iron or an iron compound selected from the group consisting of ferric hypophosphite, ferric albuminate, ferric chloride, ferric citrate, ferric oxide saccharated, ferric ammonium citrate, ferrous chloride, ferrous gluconate, ferrous iodide, ferrous sulfate, ferrous lactate, ferrous fumarate, heme, ferric trisglycinate, ferrous bisglycinate, ferric nitrate, ferrous hydroxide saccharate, ferric sulfate, ferric gluconate, ferric aspartate, ferrous sulfate heptahydrate, ferrous phosphate, ferric ascorbate, ferrous formate, ferrous acetate, ferrous malate, ferrous glutamate, ferrous cholinisocitrate, ferroglycine sulfate, ferric oxide hydrate, ferric pyrophosphate soluble, ferric hydroxide saccharate, ferric manganese saccharate, ferric subsulfate, ferric ammonium sulfate, ferrous ammonium sulfate, ferric sesquichloride, ferric choline citrate, ferric manganese citrate, ferric quinine citrate, ferric sodium citrate, ferric sodium edetate, ferric formate, ferric ammonium oxalate, ferric potassium oxalate, ferric sodium oxalate, ferric peptonate, ferric manganese peptonate; ferric acetate, ferric fluoride, ferric phosphate, ferric pyrophosphate, ferrous pyrophosphate, ferrous carbonate saccharated, ferrous carbonate mass, ferrous succinate, ferrous citrate, ferrous tartrate, ferric fumarate, ferric succinate, ferrous hydroxide, ferrous nitrate, ferrous carbonate, ferric sodium pyrophosphate, ferric tartrate, ferric potassium tartrate, ferric subcarbonate, ferric glycerophosphate, ferric saccharate, ferric hydroxide saccharate, ferric manganese saccharate, ferrous ammonium sulfate, and combinations thereof.

10. The device of claim 1, wherein the coating comprises elemental aluminum or an aluminum compound selected from the group consisting of aluminum hydroxide, aluminum nitrate, aluminum sulfate and combinations thereof.

11. The device of claim 1, wherein the coating comprises titanium dioxide.

12. The device of claim 1, wherein the coating comprises elemental manganese or a manganese compound selected from the group consisting of manganese dioxide, manganese chloride, manganese borate, manganese nitrate, manganese phosphate, manganese sulfate, and combinations thereof.

13. The device of claim 1, wherein the coating comprises at least two of iron, manganese, aluminum, or titanium.

14. The device of claim 1, wherein the coating comprises at least three of iron, manganese, aluminum, or titanium.

15. The device of claim 1 wherein said metal coating has a thickness of about 1 nm to about 100 micron.

16. The monolithic porous filtration device of claim 1, wherein the metal coating has a thickness of about 1 nm to about 100 micron.

17. The monolithic porous filtration device of claim 1, wherein the metal coating is applied to the surface of the interior pores by applying a positive or negative pressure to said monolithic porous filter element to force the coating into the interior pores.

18. The monolithic porous filtration device of claim 17, wherein the pressure is between 1 and 5 atm.

19. The monolithic porous filtration device of claim 1, wherein the metal coating is applied to the surface of the interior pores in combination with discharging of air entrapped within the interior pores.

20. The monolithic porous filtration device of claim 1, wherein the metal coating is applied to the interior surface of the pores by allowing the metal coating to flow into the interior pores using gravity.

21. The monolithic porous filtration device of claim 1, wherein the metal coating is applied to the surface of the interior pores by dipping the filter in the metal coating and allowing the metal coating to flow into the interior pores.

22. The monolithic porous filtration device of claim 21, wherein the metal coating is allowed to pass through the interior pores.

23. The monolithic porous filtration device of claim 1, wherein a wetting agent is applied to the interior surface of the interior pores prior to or concurrent with applying the coating.

24. The monolithic porous filtration device of claim 1, wherein the metal coating is applied by a process that is not a brush stroke.

* * * * *